US011398088B2

(12) United States Patent
Spivack et al.

(10) Patent No.: US 11,398,088 B2
(45) Date of Patent: Jul. 26, 2022

(54) SYSTEMS, METHODS AND APPARATUSES TO GENERATE A FINGERPRINT OF A PHYSICAL LOCATION FOR PLACEMENT OF VIRTUAL OBJECTS

(71) Applicant: Magical Technologies, LLC, Redmond, WA (US)

(72) Inventors: Nova Spivack, Redmond, WA (US); Matthew Hoerl, Redmond, WA (US); Jake Hamby, Redmond, WA (US); Armando Pena, Redmond, WA (US)

(73) Assignee: Magical Technologies, LLC, Wilmington, DE (US)

( * ) Notice: Subject to any disclaimer, the term of this patent is extended or adjusted under 35 U.S.C. 154(b) by 0 days.

(21) Appl. No.: 16/260,783

(22) Filed: Jan. 29, 2019

(65) Prior Publication Data

US 2019/0266404 A1 Aug. 29, 2019

Related U.S. Application Data

(60) Provisional application No. 62/623,893, filed on Jan. 30, 2018.

(51) Int. Cl.
*G06K 9/00* (2006.01)
*G06V 20/20* (2022.01)
(Continued)

(52) U.S. Cl.
CPC ............. *G06V 20/20* (2022.01); *G01C 21/12* (2013.01); *G06F 16/383* (2019.01);
(Continued)

(58) Field of Classification Search
None
See application file for complete search history.

(56) References Cited

U.S. PATENT DOCUMENTS 8,231,465 B2 7/2012 Yee
8,694,553 B2 4/2014 Shuster
(Continued)

FOREIGN PATENT DOCUMENTS

KR 10-2012-0007215 A 1/2012
KR 10-2012-0042253 5/2012
(Continued)

OTHER PUBLICATIONS

Previtali et al. ("A Flexible Methodology for Outdoor/Indoor Building Reconstruction From Occluded Point Clouds", ISPRS Annals of the Photogrammetry, Remote Sensing and Spatial Information Sciences, vol. II-3, 2014 ISPRS Technical Commission III Symposium, Sep. 5-7, 2014, Zurich, Switzerland) (Year: 2014).*
(Continued)

*Primary Examiner* — Yi Wang

(57) ABSTRACT

Systems, methods and apparatuses to generate a Fingerprint of a Physical Location for Placement of Virtual Objects are disclosed. In one aspect, embodiments of the present disclosure include a method, which may be implemented on a system, to generate a fingerprint of the physical location using the location metadata including one or more of, the geometric features and the physical objects. The method can further include tracking device movement in the physical location to determine a position of the device relative to the fingerprint of the physical location and rendering or placing the virtual object in the physical location based on the position of the device and the fingerprint of the physical location.

17 Claims, 9 Drawing Sheets

(51) Int. Cl.
  *G06K 9/62* (2022.01)
  *G01C 21/12* (2006.01)
  *G06F 16/387* (2019.01)
  *G06F 16/383* (2019.01)
  *G06V 10/42* (2022.01)
  *G06V 20/13* (2022.01)
  *G06V 20/00* (2022.01)
  *H04W 4/029* (2018.01)

(52) U.S. Cl.
  CPC ......... *G06F 16/387* (2019.01); *G06K 9/6256* (2013.01); *G06V 10/42* (2022.01); *G06V 20/13* (2022.01); *G06V 20/35* (2022.01); *G06V 2201/10* (2022.01); *H04W 4/029* (2018.02)

(56) References Cited

U.S. PATENT DOCUMENTS

| | | |
|---|---|---|
| 8,878,846 B1 | 11/2014 | Francis |
| 8,930,195 B1 | 1/2015 | LeBeau |
| 9,781,342 B1 | 10/2017 | Turley |
| 10,026,226 B1 | 7/2018 | Lotto |
| 10,339,721 B1 | 7/2019 | Dascola |
| 10,496,272 B1 | 12/2019 | Lonkar |
| 10,740,804 B2 | 8/2020 | Spivack |
| 10,904,374 B2 | 1/2021 | Spivack |
| 10,957,083 B2 | 3/2021 | Du |
| 11,249,714 B2 | 2/2022 | Spivack |
| 2002/0099257 A1 | 7/2002 | Parker |
| 2002/0099679 A1 | 7/2002 | Usitalo |
| 2003/0158796 A1 | 8/2003 | Balent |
| 2005/0021472 A1 | 1/2005 | Gettman |
| 2008/0140494 A1 | 6/2008 | Charuk |
| 2008/0215415 A1 | 8/2008 | Willms |
| 2009/0061901 A1 | 3/2009 | Arrasvuori |
| 2009/0144105 A1 | 6/2009 | Bletchley |
| 2009/0234948 A1 | 9/2009 | Garbow |
| 2009/0259662 A1 | 10/2009 | Cragun |
| 2009/0300122 A1 | 12/2009 | Freer |
| 2010/0100487 A1 | 4/2010 | Lingafelt |
| 2010/0114662 A1 | 5/2010 | Jung |
| 2011/0007086 A1 | 1/2011 | Kim |
| 2011/0251902 A1 | 10/2011 | Nagarajayya |
| 2012/0105473 A1 | 5/2012 | Bar-Zeev |
| 2012/0116728 A1 | 5/2012 | Shear |
| 2012/0154441 A1 | 6/2012 | Kim |
| 2012/0172131 A1 | 7/2012 | Boswell |
| 2012/0194541 A1 | 8/2012 | Kim |
| 2012/0218296 A1 | 8/2012 | Belimpasakis |
| 2012/0229508 A1 | 9/2012 | Wigdor |
| 2012/0239213 A1* | 9/2012 | Nagata .................. G06Q 50/06 700/291 |
| 2012/0249741 A1 | 10/2012 | Maciocci |
| 2012/0254858 A1 | 10/2012 | Moyers |
| 2012/0256954 A1 | 10/2012 | Soon-Shiong |
| 2012/0290366 A1 | 11/2012 | Giles |
| 2013/0083173 A1 | 4/2013 | Geisner |
| 2013/0135344 A1 | 5/2013 | Stirbu |
| 2013/0141419 A1 | 6/2013 | Mount |
| 2013/0211945 A1 | 8/2013 | Po-Ching |
| 2013/0263016 A1 | 10/2013 | Lehtiniemi |
| 2013/0286004 A1 | 10/2013 | McCulloch |
| 2013/0293468 A1 | 11/2013 | Perez |
| 2013/0293584 A1 | 11/2013 | Anderson |
| 2013/0336093 A1* | 12/2013 | Suvanto ................. G01S 7/521 367/99 |
| 2014/0028712 A1 | 1/2014 | Keating |
| 2014/0047027 A1 | 2/2014 | Moyers |
| 2014/0059447 A1 | 2/2014 | Berk |
| 2014/0063060 A1 | 3/2014 | Maciocci |
| 2014/0063197 A1* | 3/2014 | Yamamoto ........... G06T 15/205 348/46 |
| 2014/0071164 A1 | 3/2014 | Saklatvala |
| 2014/0100955 A1 | 4/2014 | Osotio |
| 2014/0100994 A1 | 4/2014 | Tatzel |
| 2014/0100997 A1 | 4/2014 | Mayerle |
| 2014/0114845 A1 | 4/2014 | Rogers |
| 2014/0168121 A1 | 6/2014 | Chou |
| 2014/0184496 A1 | 7/2014 | Gribetz |
| 2014/0208272 A1 | 7/2014 | Vats |
| 2014/0337920 A1 | 11/2014 | Giobbi |
| 2014/0361971 A1 | 12/2014 | Sala |
| 2014/0369558 A1 | 12/2014 | Holz |
| 2014/0372540 A1 | 12/2014 | Libin |
| 2015/0005070 A1 | 1/2015 | Monahan |
| 2015/0019983 A1 | 1/2015 | White |
| 2015/0031440 A1 | 1/2015 | Desanti |
| 2015/0055821 A1 | 2/2015 | Fotland |
| 2015/0058102 A1 | 2/2015 | Christensen |
| 2015/0123966 A1 | 5/2015 | Newman |
| 2015/0130689 A1 | 5/2015 | Sugden |
| 2015/0130836 A1 | 5/2015 | Anderson |
| 2015/0187137 A1 | 7/2015 | Mullins |
| 2015/0206349 A1 | 7/2015 | Rosenthal |
| 2015/0213355 A1 | 7/2015 | Sharma |
| 2015/0254793 A1 | 9/2015 | Hastings |
| 2015/0263460 A1 | 10/2015 | Huan |
| 2015/0302517 A1* | 10/2015 | Spivack ............. G06K 9/00671 705/26.9 |
| 2015/0302652 A1* | 10/2015 | Miller ...................... G06T 7/60 345/419 |
| 2015/0371447 A1 | 12/2015 | Yasutake |
| 2015/0378440 A1 | 12/2015 | Umlauf |
| 2016/0026253 A1 | 1/2016 | Bradski |
| 2016/0100034 A1 | 4/2016 | Miller |
| 2016/0133230 A1 | 5/2016 | Daniels |
| 2016/0134805 A1 | 5/2016 | Takahashi |
| 2016/0175715 A1 | 6/2016 | Ye |
| 2016/0203645 A1 | 7/2016 | Knepp |
| 2016/0217623 A1 | 7/2016 | Singh |
| 2016/0234643 A1 | 8/2016 | Crutchfield |
| 2016/0314609 A1 | 10/2016 | Taylor |
| 2016/0323332 A1 | 11/2016 | Welinder |
| 2016/0330522 A1 | 11/2016 | Newell |
| 2016/0335289 A1 | 11/2016 | Andrews |
| 2016/0342782 A1 | 11/2016 | Mullins |
| 2017/0052507 A1 | 2/2017 | Poulos |
| 2017/0093780 A1 | 3/2017 | Lieb |
| 2017/0103584 A1 | 4/2017 | Vats |
| 2017/0123750 A1 | 5/2017 | Todasco |
| 2017/0154242 A1 | 6/2017 | Blanchflower |
| 2017/0178373 A1 | 6/2017 | Sarafa |
| 2017/0186232 A1 | 6/2017 | Dange |
| 2017/0193276 A1 | 7/2017 | Choi |
| 2017/0193314 A1 | 7/2017 | Kim |
| 2017/0243403 A1 | 8/2017 | Daniels |
| 2017/0244703 A1 | 8/2017 | Lee |
| 2017/0316186 A1 | 11/2017 | Breitenfeld |
| 2017/0323266 A1 | 11/2017 | Seo |
| 2017/0366748 A1 | 12/2017 | Festa |
| 2018/0053267 A1 | 2/2018 | Penner |
| 2018/0068019 A1 | 3/2018 | Novikoff |
| 2018/0089869 A1 | 3/2018 | Bostick |
| 2018/0096362 A1 | 4/2018 | Kwan |
| 2018/0113594 A1 | 4/2018 | Alnatsheh |
| 2018/0145937 A1 | 5/2018 | Choi |
| 2018/0190003 A1 | 7/2018 | Upadhyay |
| 2018/0190166 A1 | 7/2018 | Salmimaa |
| 2018/0196585 A1 | 7/2018 | Densham |
| 2018/0210643 A1 | 7/2018 | Ghassabian |
| 2018/0231921 A1 | 8/2018 | Smith |
| 2018/0268589 A1 | 9/2018 | Grant |
| 2018/0308287 A1 | 10/2018 | Daniels |
| 2018/0330542 A1 | 11/2018 | Bharti |
| 2018/0349088 A1 | 12/2018 | Leppanen |
| 2018/0350146 A1 | 12/2018 | Gervasio |
| 2018/0365883 A1* | 12/2018 | Fillhardt ................. G06F 3/011 |
| 2018/0365897 A1 | 12/2018 | Pahud |
| 2018/0365898 A1 | 12/2018 | Costa |
| 2019/0005724 A1 | 1/2019 | Pahud |
| 2019/0034765 A1 | 1/2019 | Keehler |
| 2019/0080172 A1* | 3/2019 | Zheng ................. H04N 5/23293 |
| 2019/0102946 A1 | 4/2019 | Spivack |
| 2019/0107935 A1 | 4/2019 | Spivack |

(56) References Cited

U.S. PATENT DOCUMENTS

| | | |
|---|---|---|
| 2019/0107990 A1 | 4/2019 | Spivack |
| 2019/0107991 A1 | 4/2019 | Spivack |
| 2019/0108558 A1 | 4/2019 | Spivack |
| 2019/0108578 A1 | 4/2019 | Spivack |
| 2019/0108580 A1 | 4/2019 | Spivack |
| 2019/0108682 A1 | 4/2019 | Spivack |
| 2019/0108686 A1 | 4/2019 | Spivack |
| 2019/0132700 A1 | 5/2019 | Yokoyama |
| 2019/0179405 A1 | 6/2019 | Sun |
| 2019/0188450 A1 | 6/2019 | Spivack |
| 2019/0236259 A1 | 8/2019 | Remillet |
| 2019/0253542 A1 | 8/2019 | Fan |
| 2019/0260870 A1 | 8/2019 | Spivack |
| 2019/0266404 A1 | 8/2019 | Spivack |
| 2019/0295298 A1 | 9/2019 | VanBlon |
| 2019/0318076 A1 | 10/2019 | Chun |
| 2019/0355050 A1 | 11/2019 | Geisrer |
| 2019/0391637 A1 | 12/2019 | Taylor |
| 2019/0392085 A1 | 12/2019 | Ragan |
| 2020/0019295 A1 | 1/2020 | Spivack |
| 2020/0021784 A1 | 1/2020 | Grusche |
| 2020/0068133 A1 | 2/2020 | Spivack |
| 2020/0294311 A1 | 9/2020 | Holz |
| 2021/0026441 A1 | 1/2021 | Spivack |
| 2021/0110608 A1 | 4/2021 | Elby |
| 2021/0074068 A1 | 11/2021 | Spivack |

FOREIGN PATENT DOCUMENTS

| | | |
|---|---|---|
| KR | 10-2014-0043522 A | 4/2014 |
| KR | 10-2014-0088578 | 7/2014 |
| KR | 10-1693631 | 1/2017 |
| WO | 2017093605 | 6/2017 |
| WO | 2019023659 | 1/2019 |
| WO | 2019028159 | 2/2019 |
| WO | 2019028479 | 2/2019 |
| WO | 2019055703 | 3/2019 |
| WO | 2019079826 | 4/2019 |
| WO | 2020018431 | 1/2020 |

OTHER PUBLICATIONS

IPRP for Application No. PCT/US19/41821, Date of filing: Jul. 15, 2019, Applicant: Magical Technologies, LLC, dated Nov. 21, 2019, 8 pages.
International Search Report & Written Opinion for Application No. PCT/US18/44214, Date of filing: Jul. 27, 2018, Applicant: Magical Technologies, LLC, dated Nov. 23, 2018, 20 pages.
International Search Report & Written Opinion for Application No. PCT/US18/44844, Date of filing: Aug. 1, 2018, Applicant: Magical Technologies, LLC, dated Nov. 16, 2018, 13 pages.
International Search Report & Written Opinion for Application No. PCT/US18/45450, Date of filing: Aug. 6, 2018, Applicant: Magical Technologies, LLC, dated Jan. 2, 2019, 20 pages.
International Search Report & Written Opinion for Application No. PCT/US18/50952, Date of filing: Sep. 13, 2018, Applicant: Magical Technologies, LLC, dated Mar. 15, 2019, 22 pages.
International Search Report & Written Opinion for Application No. PCT/US18/56951, Date of filing: Oct. 22, 2018, Applicant: Magical Technologies, LLC, dated Feb. 22, 2019, 17 pages.
International Search Report & Written Opinion for Application No. PCT/US19/41821, Date of filing: Jul. 15, 2019, Applicant; Magical Technologies, LLC, dated Nov. 21, 2019, 9 pages.
"Fujifilm balloon" (downloaded @https://web.archive.org/web/20150514181842/http://www.imageafter.com/image.php?image=b2ain/ehicle3002.jpg, (Year: 2015).
"Print Ad Rates" downloaded @ https://web.archrve.org/web/20160319050126/https://diverseeducation.com/media-kit/print-ad-rates/,available online since Mar. 14, 2016 (Year: 2016).
Mehdi Mekni et al., 'Augmented Reality Applications, Challenges and Future Trends', Applied computer and applied computational science, Apr. 25, 2014, pp. 205-214.

IPRP for Application No. PCT/US18/44214, Date of filing: Jul. 27, 2018, Applicant: Magical Technologies, LLC, dated Jan. 28, 2020, 18 pages.
IPRP for Application No. PCT/US18/44844, Date of filing: Aug. 1, 2018, Applicant: Magical Technologies, LLC, dated Feb. 4, 2020, 11 pages.
IPRP for Application No. PCT/US18/45450, Date of filing: Aug. 6, 2018, Applicant: Magical Technologies, LLC, dated Feb. 13, 2020, 10 pages.
IPRP for Application No. PCT/US18/50925, Date of filing: Sep. 13, 2018, Applicant: Magical Technologies, LLC, dated Mar. 17, 2020, 12 pages.
Szemenyei, Maiden, and Ferenc Vajda. "3d object detection and scene optimization for tangible augmented reality." Periodica Polytechnica Electrical Engineering and Computer Science 62.2 (2018): 25-3. (Year: 2018).
U.S. Appl. No. 16/048,190, filed Jul. 27, 2018, now U.S. Pat. No. 10,740,804, dated Aug. 11, 2020, Systems, Methods and Apparatuses of Seamless Integration of Augmented, Alternate, Virtual, and/or Mixed Realities with Physical Realities for Enhancement of Web, Mobile and/or Other Digital Experiences.
U.S. Appl. No. 16/048,195, filed Jul. 27, 2018, Systems, methods and apparatuses to facilitate physical and non-physical interaction/action/reactions between alternate realities.
U.S. Appl. No. 16/048,199, filed Jul. 27, 2018, Systems, Methods and Apparatuses Of Multidimensional Mapping Of Universal Locations Or Location Ranges For Alternate Or Augmented Digital Experiences.
U.S. Appl. No. 16/048,205, filed Jul. 27, 2018, Systems, Methods and Apparatuses To Create Real World Value And Demand For Virtual Spaces Via An Alternate Reality Environment.
U.S. Appl. No. 16/792,252, filed Feb. 16, 2020, Seamless Integration of Augmented, Alternate, Virtual, and/or Mixed Realities with Physical Realities for Enhancement of Web, Mobile and/or Other Digital Experiences.
U.S. Appl. No. 16/052,720, filed Aug. 2, 2018, Systems, Methods and Apparatuses to Facilitate Trade or Exchange of Virtual Real-Estate Associated With a Physical Space.
U.S. Appl. No. 17/502,127, filed Oct. 15, 2021, Systems, Methods and Apparatuses to Facilitate Trade or Exchange of Virtual Real-Estate Associated With a Physical Space.
U.S. Appl. No. 16/056,507, filed Aug. 6, 2018, Systems, Methods and Apparatuses for Deployment and Targeting of Context-Aware Virtual Objects and/or Behavior Modelling of Virtual Objects Based on Physical Principles.
U.S. Appl. No. 16/130,499, filed Sep. 13, 2018, Systems And Methods Of Shareable Virtual Objects and Virtual Objects As Message Objects To Facilitate Communications Sessions In An Augmented Reality Environment.
U.S. Appl. No. 16/130,541, filed Sep. 13, 2018, Systems And Methods Of Virtual Billboarding And Collaboration Facilitation In An Augmented Reality Environment.
U.S. Appl. No. 16/130,585, filed Sep. 13, 2018, Systems And Methods Of Rewards Object Spawning And Augmented Reality Commerce Platform Supporting Multiple Seller Entities.
U.S. Appl. No. 16/853,815, filed Apr. 21, 2020, Systems, Methods and Apparatuses of Digital Assistants in an Augmented Reality Environment and Local Determination of Virtual Object Placement and Apparatuses of Single or Multi-directional Lens as Portals Between a Physical World and a Digital World Component of the Augmented Reality Environment.
U.S. Appl. No. 16/181,478, filed Nov. 6, 2018, Systems, Methods and Apparatuses for Deployment of Virtual Objects based on content segment consumed in a target environment.
U.S. Appl. No. 16/260,783, filed Jan. 29, 2019, Systems, Methods and Apparatuses to Generate a Fingerprint of a Physical Location for Placement of Virtual Objects.
U.S. Appl. No. 16/252,886, filed Jan. 21, 2019, now U.S. Pat. No. 10,904,374, dated Jan. 26, 2021, Systems, Methods and Apparatuses to Facilitate Gradual or Instantaneous Adjustment in Levels of Perceptibility of Virtual Objects or Reality Object in a Digital Scene.

(56) References Cited

OTHER PUBLICATIONS

U.S. Appl. No. 17/136,062, filed Dec. 29, 2020, Systems, Methods and Apparatuses to Facilitate Gradual or Instantaneous Adjustment in Levels of Perceptibility of Virtual Objects or Reality Object in a Digital Scene.
U.S. Appl. No. 16/511,186, filed Jul. 15, 2019, Systems and Methods To Administer a Chat Session In An Augmented Reality Environment.
U.S. Appl. No. 16/,547,817, filed Aug. 22, 2019, Edge-Facing Camera Enabled Systems, Methods and Apparatuses.
U.S. Appl. No. 16/806,162, filed Mar. 2, 2020, Virtual Object Control Of A Physical Device and/or Physical Device Control of A Virtual Object.
"Print Ad Rates" downloaded @ https://web.archive.org/web/20160319050126/https://diverseeducation.com/media-kit/print-ad-rates/,available online since Mar. 14, 2016 (Year: 2016).
International Search Report & Written Opinion for Application No. PCT/US18/50952, Date of filing: Sep. 13, 2018, Applicant: Magical Technologies, LLC, dated Mar. 17, 2020, 12 pages.
Previtali et al. ("A Flexible Methodology for Outdoor/Indoor Building Reconstruction From Occluded Point Clouds", ISRS Annals of the Photogrammetry, Remote Sensing and Spatial Information Sciences, vol. II-3, 2014 ISPRS Technical Commission III Symposium, Sep. 5-7, 2014, Zurich, Switzerland) (Year: 2014).
IPRP for Application No. PCT/US18/56951, Date of filing: Oct. 22, 2018, Applicant: Magical Technologies, LLC, dated Apr. 28, 2020, 16 pages.
English translation of KR 2012-0042253.
English translation of KR 2014-0088578.
English translation of KR 101693631 BI.
English translation of KR 20120007215 A.
English translation of KR 20140043522 A.

\* cited by examiner

SYSTEMS, METHODS AND APPARATUSES TO GENERATE A FINGERPRINT OF A PHYSICAL LOCATION FOR PLACEMENT OF VIRTUAL OBJECTS

CLAIM OF PRIORITY

This application claims the benefit of:
U.S. Provisional Application No. 62/623,893, filed Jan. 30, 2018 and entitled "Systems, Methods and Apparatuses of Enhanced or Precise Determination of a Real World Location Including Augmented Reality Applications Thereof," (8007.US00), the contents of which are incorporated by reference in their entirety.

RELATED APPLICATIONS

This application is related to PCT Application no. PCT/US2018/44844, filed Aug. 1, 2018 and entitled "Systems, Methods and Apparatuses to Facilitate Trade or Exchange of Virtual Real-Estate Associated with a Physical Space", the contents of which are incorporated by reference in their entirety.

This application is related to PCT Application no. PCT/US2018/45450, filed Aug. 6, 2018 and entitled "Systems, Methods and Apparatuses for Deployment and Targeting of Context-Aware Virtual Objects and/or Objects and/or Behavior Modeling of Virtual Objects Based on Physical Principles", the contents of which are incorporated by reference in their entirety.

This application is related to PCT Application no. PCT/US2018/50952, filed on Sep. 13, 2018 and entitled "Systems And Methods Of Shareable Virtual Objects and Virtual Objects As Message Objects To Facilitate Communications Sessions In An Augmented Reality Environment", the contents of which are incorporated by reference in their entirety.

This application is related to PCT Application No. Pct/us2018/56951, filed Oct. 22, 2018 and entitled "Systems, methods and apparatuses of digital assistants in an augmented reality environment and local determination of virtual object placement and apparatuses of single or multi-directional lens as portals between a physical world and a digital world component of the augmented reality environment" (8005.WO01), the contents of which are incorporated by reference in their entirety.

TECHNICAL FIELD

The disclosed technology relates generally to techniques for determining an accurate or precise real world location.

BACKGROUND

The advent of the World Wide Web and its proliferation in the 90's transformed the way humans conduct business, personal lives, consume/communicate information and interact with or relate to others. A new wave of technology is on the cusp of the horizon to revolutionize our already digitally immersed lives.

DETAILED DESCRIPTION

Figure 1:
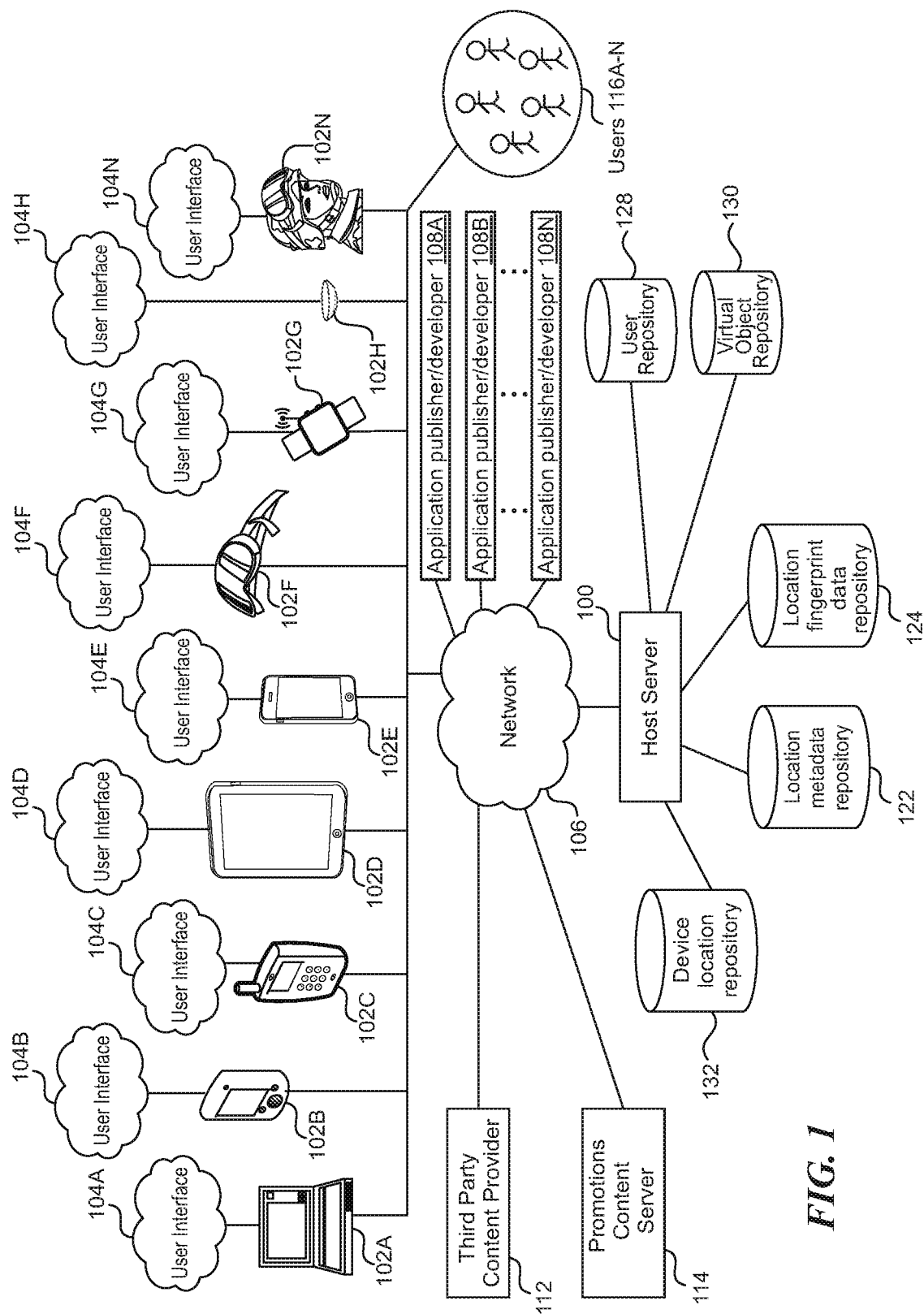
FIG. 1 illustrates an example block diagram of a host server able to generate a fingerprint of a physical location for placement of virtual objects associated with the physical location, in accordance with embodiments of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

The disclosed technology generally relates to systems, methods and apparatuses for determining an accurate or precise real world position sufficient to place, store or dispose of a virtual object in a digital environment. As such, the real world location associated with or to be associated with the virtual object can be precisely determined or determined with sufficient precision or accuracy. Virtual objects, in augmented reality for example, can be presented in a digital environment to be sufficiently close or at a real world location, or a real world location with which the virtual object is intended to be otherwise associated.

One advantage of the disclosed innovation is that a location of a given virtual object in the real world environment is substantially the same for real world users observing it on their respective devices or the users can observe a given virtual object from a predetermined perspective or reference.

Augmented reality systems, applications or platforms operate based on for example, detection/identification of surfaces (e.g., vertical, diagonal and/or horizontal surfaces) in the real world (e.g., as can be captured through a camera or displayed on the screen), and position virtual objects relative to those planes in an intuitive way. This can be achieved with machine vision techniques (e.g. edge detection and/or knowledge of parallax) combined with information obtained from positioning sensors (e.g., gyroscope, accelerometer) about the movement of the imaging unit (e.g., camera lens) within the real-world environment.

For example, an augmented reality ('AR') system can generally include a reality scene or view from the imaging device (e.g., captured camera image or video), with virtual objects (e.g., 2D or 3D computer-generated objects) layered on top, in such a way that the virtual objects appear to be part of the real-world scene. Various frameworks for placing and positioning AR objects include: systems which use a combination of the onboard satellite navigation receiver, triangulation from known WiFi access points, cell towers, and/or Bluetooth LE beacons, and magnetic compass, gyroscope and accelerometer to determine a device's geographic location, altitude, orientation, and position relative to any nearby beacons. However, this framework does not make reference to the camera view, and the accuracy can vary from 4 m to 150 m, which can be inaccurate for placing objects within a real-word scene.

Innovative aspects of the present disclosure resolve location accuracy issues and further refine the accuracy by for example using one or more of the processes including, methods to detect walls, surfaces, corners of rooms, furniture, and/or other features to help the system position and place virtual objects indoors (e.g., within an enclosed space), and/or outdoors.

The disclosed system can precisely position objects in scenarios where location data from a location-aware device (e.g., a smart phone, wearables, headmounted device, other smart devices) is inaccurate (especially common indoors) or insufficiently precise in general or for a given application. Rather than depending on eventually getting an accurate geographic location for any given augmented reality scene where the user can place objects, the disclosed system can store object positions (locally cached and/or on the server) in the form of locations and/or orientations relative to a 3D fingerprint of the location that the system captured when the object was placed, or relative to an updated or composite 3D fingerprint of the scene that can be subsequently matched with it.

Furthermore, by accurately detecting walls, floors, tables, ceilings, windows, vertical, slanted, diagonal, substantially flat, and/or other non-horizontal surfaces or non-vertical surfaces, and the approximate distances from an imaging unit to any number of the surfaces or features, the disclosed system is able to provide an enhanced user experience for placing, positioning, and interacting with virtual objects. Embodiments of the present disclosure include systems and methods to determine a sufficiently precise or accurate positioning of a virtual object relative in a real world environment whether indoors or outdoors. Embodiments of the present disclosure further include disposing or presenting a virtual object in the real world environment which location is sufficiently or accurately precise.

One embodiment includes utilizing computer vision methods to detect the distance between the virtual object and horizontal/vertical surfaces and/or a distance between the virtual object and various anchor points (e.g., visual anchor points) and/or landmarks in the real world environment.

For example, the system can detect stationary object edges such as object edges designated by the system as being permanent or sufficiently permanent. Such edges can be used for subsequent or future recognition of a physical location. In some embodiments object detection and/or image segmentation algorithms, including but not limited to, faster R-CNN (regional convolutional neural network) or Mask R-CNN can be used to determine the nature of the stationary objects and classify them by their function such as doors, door frames, mirrors, windows, and other framing objects.

Note the relative distances between the virtual object and the physical real world objects (e.g., which may be stationary or in motion) and/or surrounding landmarks can be transmitted to and stored in a remote server. The relative distances can be sent to or shared with a nearby system/ device, for example, in a server-device or in a peer to peer fashion. This is advantageous in that it eliminates the need for round-trip transmission to the remote server. One benefit of sharing distance & location info among peers to enhance the accuracy is that it optimizes data consumption or decreases or optimizes resource consumption on the server side.

In further embodiments, the disclosed computer vision techniques can also be used to identify or detect textures & object types, e.g. brick wall, wooden table, potted plant, linens, windows, any known object in a given environment (office, house, kitchen, class room, etc.), reflective surfaces, light fixtures, street lights, billboards, street signs, streets, stop signs, etc. Moreover, fuzzy matching can be used to detect or identify places seen previously, to enable precise relative object placement when GPS location is inaccurate or not available. This can be achieved by object detection and/or image segmentation algorithms, such as using Faster R-CNN (regional convolutional neural network) and/or Mask R-CNN techniques.

The system can also extend 2D object detection algorithms by merging the results of analysis of specific frames from the camera using knowledge of the camera's position and orientation, to create a 3D model of the room/scene/area that contains the recognized objects. In a further embodiment, audio analysis (e.g., passive listening and/or active echolocation) can be performed to identify rooms (based on acoustics or unusual audio sources) and/or measure distances to vertical surfaces such as walls (echolocation). In particular, individual microphones can be recorded.

Example embodiments include a system and/or method to emit ultrasonic "ping" sounds from audio devices (e.g., phone speaker(s), computer speakers, standalone speakers, etc.) and detect echos from the microphones. This can be implemented with wearable devices such as a headmounted device or a smart watch, to detect distance between watch and phone. The user can approve microphone access on the device. Note that ultrasonic communication can be used to communicate between devices. Echolocation to detect room sizes can be used in conjunction with the information from the camera, and can be helpful for finding distances between users, or the user's hand placement (e.g., user wearing a smartwatch on a wrist). In addition, visual perspective transforms can be performed to crop images showing textures of individual objects and/or walls to be identified using machine learning techniques, or to save in compressed form to be able to generate a photorealistic 3D version of the real-world scene.

Embodiments of the present disclosure include systems and methods for adjusting levels of perceptibility of user-perceivable content/information via a platform which facilitates user interaction with objects in a digital environment. Aspects of the present disclosure include techniques to control or adjust various mixtures of perceptibility, in a digital environment, between the real world objects/content/environment and virtual objects/content/environment. Embodiments of the present disclosure further include control or adjustment of relative perceptibility between real things (e.g., real world objects/content/environment) and virtual things (e.g., virtual objects/content/environment).

The innovation includes for example, techniques to control or adjust various mixtures of perceptibility, in a digital environment, between the real world objects/content/environment and virtual objects/content/environment.

Digital Objects

The digital objects presented by the disclosed system in a digital environment, can, for instance, include:

a) 'virtual objects' which can include any computer generated, computer animated, digitally rendered/reproduced, artificial objects/environment and/or synthetic objects/environment. Virtual objects need not have any relation or context to the real world or its phenomena or its object places or things. Virtual objects generally also include the relative virtual objects or 'simulated objects' as described below in b).

b) 'Relative virtual objects' or also referred to as 'simulated objects' can generally include virtual objects/environments that augment or represent real objects/environments of the real world. Relative virtual objects (e.g., simulated objects) generally further include virtual objects that are temporally or spatially relevant and/or has any relation, relevance, ties, correlation, anti-correlation, context to real world phenomenon, concepts or its objects, places, persons or things; 'relative virtual objects' or 'simulated objects' can also include or have relationships to, events, circumstances, causes, conditions, context, user behavior or profile or intent, nearby things, other virtual objects, program state, interactions with people or virtual things or physical things or real or virtual environments, real or virtual physical laws, game mechanics, rules. In general 'relative virtual objects' can include any digital object that appears, disappears, or is generated, modified or edited based on any of the above factors.

c) 'Reality objects' or 'basic reality objects' which can perceptibly (e.g., visually or audibly) correspond to renderings or exact/substantially exact reproductions of reality itself. Reality includes tangibles or intangible in the real world. Such renderings or reproductions can include by way of example, an image, a (screenshot) shot, photo, video, live stream of a physical scene and/or its visible component or recordings or (live) stream of an audible component, e.g., sound of an airplane, traffic noise, Niagara falls, birds chirping.

The disclosed system (e.g. host server 100 of FIG. 1 and/or host server 300 of FIG. 3A-3B) can depict/present/augment, via a user device any combination/mixture of: virtual objects (including 'relative virtual objects') and reality objects (or, also referred to as 'basic reality objects'). Any mixture of such objects can be depicted in a digital environment (e.g., via visible area or user-perceptible area on a display or device, or a projection in the air/space).

Embodiments of the present disclosure further enable and facilitate adjustment and selection of the level/degree of perceptibility amongst the objects of varying levels of 'virtualness.' by a user, by a system, a platform or by any given application/software component in a given system.

Specifically, innovative aspects of the present disclosure include facilitating selection or adjustment of perceptibility (human perceptibility) amongst the virtual objects, reality objects, and/or relative virtual objects (e.g., simulated objects) in a digital environment (e.g., for any given scene or view). This adjustment and selection mechanism (e.g., via the user controls shown in the examples of FIG. 6A-6B) affects the virtualness of any given digital environment, with increased perceptibility of virtual objects generally corresponding to a higher virtualness level, with decreased perceptibility of virtual objects corresponding to a lower virtualness level. Similarly, decreased perceptibility of reality objects corresponds to increased virtualness and increased perceptibility of reality objects corresponds generally to decreased virtualness.

In one example embodiment of the present disclosure, opacity is used to adjust various components or objects in a digital environment can be thought of or implemented as a new dimension in a platform or user interface like window size and window location.

Embodiments of the present disclosure include systems, methods and apparatuses of platforms (e.g., as hosted by the host server 100 as depicted in the example of FIG. 1) for deployment and targeting of context-aware virtual objects and/or behavior modeling of virtual objects based on physical laws or principle. Further embodiments relate to how interactive virtual objects that correspond to content or physical objects in the physical world are detected and/or generated, and how users can then interact with those virtual objects, and/or the behavioral characteristics of the virtual objects, and how they can be modeled. Embodiments of the present disclosure further include processes that augmented reality data (such as a label or name or other data) with media content, media content segments (digital, analog, or physical) or physical objects. Yet further embodiments of the present disclosure include a platform (e.g., as hosted by the host server 100 as depicted in the example of FIG. 1) to provide an augmented reality (AR) workspace in a physical space, where a virtual object can be rendered as a user interface element of the AR workspace.

Embodiments of the present disclosure further include systems, methods and apparatuses of platforms (e.g., as hosted by the host server 100 as depicted in the example of FIG. 1) for managing and facilitating transactions or other activities associated with virtual real-estate (e.g., or digital real-estate). In general, the virtual or digital real-estate is associated with physical locations in the real world. The platform facilitates monetization and trading of a portion or portions of virtual spaces or virtual layers (e.g., virtual real-estate) of an augmented reality (AR) environment (e.g., alternate reality environment, mixed reality (MR) environment) or virtual reality VR environment.

In an augmented reality environment (AR environment), scenes or images of the physical world is depicted with a virtual world that appears to a human user, as being superimposed or overlaid of the physical world. Augmented reality enabled technology and devices can therefore facilitate and enable various types of activities with respect to and within virtual locations in the virtual world. Due to the inter connectivity and relationships between the physical world and the virtual world in the augmented reality environment, activities in the virtual world can drive traffic to the corresponding locations in the physical world. Similarly, content or virtual objects (VOBs) associated with busier physical locations or placed at certain locations (e.g., eye level versus other levels) will likely have a larger potential audience.

By virtue of the inter-relationship and connections between virtual spaces and real world locations enabled by or driven by AR, just as there is a value to real-estate in the real world locations, there can be inherent value or values for the corresponding virtual real-estate in the virtual spaces. For example, an entity who is a right holder (e.g., owner, renter, sub-lettor, licensor) or is otherwise associated a region of virtual real-estate can control what virtual objects can be placed into that virtual real-estate.

The entity that is the rightholder of the virtual real-state can control the content or objects (e.g., virtual objects) that can be placed in it, by whom, for how long, etc. As such, the disclosed technology includes a marketplace (e.g., as run by server 100 of FIG. 1) to facilitate exchange of virtual real-estate (VRE) such that entities can control object or content placement to a virtual space that is associated with a physical space.

Embodiments of the present disclosure further include systems, methods and apparatuses of seamless integration of augmented, alternate, virtual, and/or mixed realities with physical realities for enhancement of web, mobile and/or other digital experiences. Embodiments of the present disclosure further include systems, methods and apparatuses to facilitate physical and non-physical interaction/action/reactions between alternate realities. Embodiments of the present disclosure also systems, methods and apparatuses of multidimensional mapping of universal locations or location ranges for alternate or augmented digital experiences. Yet further embodiments of the present disclosure include systems, methods and apparatuses to create real world value and demand for virtual spaces via an alternate reality environment.

The disclosed platform enables and facilitates authoring, discovering, and/or interacting with virtual objects (VOBs). One example embodiment includes a system and a platform that can facilitate human interaction or engagement with virtual objects (hereinafter, 'VOB,' or 'VOBs') in a digital realm (e.g., an augmented reality environment (AR), an alternate reality environment (AR), a mixed reality environment (MR) or a virtual reality environment (VR)). The human interactions or engagements with VOBs in or via the disclosed environment can be integrated with and bring utility to everyday lives through integration, enhancement or optimization of our digital activities such as web browsing, digital (online, or mobile shopping) shopping, socializing (e.g., social networking, sharing of digital content, maintaining photos, videos, other multimedia content), digital communications (e.g., messaging, emails, SMS, mobile communication channels, etc.), business activities (e.g., document management, document procession), business processes (e.g., IT, HR, security, etc.), transportation, travel, etc.

The disclosed innovation provides another dimension to digital activities through integration with the real world environment and real world contexts to enhance utility, usability, relevancy, and/or entertainment or vanity value through optimized contextual, social, spatial, temporal awareness and relevancy. In general, the virtual objects depicted via the disclosed system and platform, can be contextually (e.g., temporally, spatially, socially, user-specific, etc.) relevant and/or contextually aware. Specifically, the virtual objects can have attributes that are associated with or relevant real world places, real world events, humans, real world entities, real world things, real world objects, real world concepts and/or times of the physical world, and thus its deployment as an augmentation of a digital experience provides additional real life utility.

Note that in some instances, VOBs can be geographically, spatially and/or socially relevant and/or further possess real life utility. In accordance with embodiments of the present disclosure, VOBs can be or appear to be random in appearance or representation with little to no real world relation and have little to marginal utility in the real world. It is possible that the same VOB can appear random or of little use to one human user while being relevant in one or more ways to another user in the AR environment or platform.

The disclosed platform enables users to interact with VOBs and deployed environments using any device (e.g., devices 102A-N in the example of FIG. 1), including by way of example, computers, PDAs, phones, mobile phones, tablets, head mounted devices, goggles, smart watches, monocles, smart lens, smart watches and other smart apparel (e.g., smart shoes, smart clothing), and any other smart devices.

In one embodiment, the disclosed platform includes an information and content in a space similar to the World Wide Web for the physical world. The information and content can be represented in 3D and or have 360 or near 360 degree views. The information and content can be linked to one another by way of resource identifiers or locators. The host server (e.g., host server 100 as depicted in the example of FIG. 1) can provide a browser, a hosted server, and a search engine, for this new Web.

Embodiments of the disclosed platform enables content (e.g., VOBs, third party applications, AR-enabled applications, or other objects) to be created and placed into layers (e.g., components of the virtual world, namespaces, virtual world components, digital namespaces, etc.) that overlay geographic locations by anyone, and focused around a layer that has the highest number of audience (e.g., a public layer). The public layer can in some instances, be the main discovery mechanism and source for advertising venue for monetizing the disclosed platform.

In one embodiment, the disclosed platform includes a virtual world that exists in another dimension superimposed on the physical world. Users can perceive, observe, access, engage with or otherwise interact with this virtual world via a user interface (e.g., user interface 104A-N as depicted in the example of FIG. 1) of client application (e.g., accessed via using a user device, such as devices 102A-N as illustrated in the example of FIG. 1).

One embodiment of the present disclosure includes a consumer or client application component (e.g., as deployed on user devices, such as user devices 102A-N as depicted in the example of FIG. 1) which is able to provide geo-contextual awareness to human users of the AR environment and platform. The client application can sense, detect or recognize virtual objects and/or other human users, actors, non-player characters or any other human or computer participants that are within range of their physical location, and can enable the users to observe, view, act, interact, react with respect to the VOBs.

Furthermore, embodiments of the present disclosure further include an enterprise application (which can be desktop, mobile or browser based application). In this case, retailers, advertisers, merchants or third party e-commerce platforms/sites/providers can access the disclosed platform through the enterprise application which enables management of paid advertising campaigns deployed via the platform.

Users (e.g., users 116A-N of FIG. 1) can access the client application which connects to the host platform (e.g., as hosted by the host server 100 as depicted in the example of FIG. 1). The client application enables users (e.g., users 116A-N of FIG. 1) to sense and interact with virtual objects ("VOBs") and other users ("Users"), actors, non-player characters, players, or other participants of the platform. The VOBs can be marked or tagged (by QR code, other bar codes, or image markers) for detection by the client application.

One example of an AR environment deployed by the host (e.g., the host server 100 as depicted in the example of FIG. 1) enables users to interact with virtual objects (VOBs) or applications related to shopping and retail in the physical world or online/e-commerce or mobile commerce. Retailers, merchants, commerce/e-commerce platforms, classified ad systems, and other advertisers will be able to pay to promote virtual objects representing coupons and gift cards in physical locations near or within their stores. Retailers can benefit because the disclosed platform provides a new way to get people into physical stores. For example, this can be a way to offer VOBs can are or function as coupons and gift cards that are available or valid at certain locations and times.

Additional environments that the platform can deploy, facilitate, or augment can include for example AR-enabled games, collaboration, public information, education, tourism, travel, dining, entertainment etc.

The seamless integration of real, augmented and virtual for physical places/locations in the universe is a differentiator. In addition to augmenting the world, the disclosed system also enables an open number of additional dimensions to be layered over it and, some of them exist in different spectra or astral planes. The digital dimensions can include virtual worlds that can appear different from the physical world. Note that any point in the physical world can index to layers of virtual worlds or virtual world components at that point. The platform can enable layers that allow non-physical interactions.

FIG. 1 illustrates an example block diagram of a host server 100 able to generate a fingerprint of a physical location for placement of virtual objects associated with the physical location, in accordance with embodiments of the present disclosure.

The client devices 102A-N can be any system and/or device, and/or any combination of devices/systems that is able to establish a connection with another device, a server and/or other systems. Client devices 102A-N each typically include a display and/or other output functionalities to present information and data exchanged between among the devices 102A-N and the host server 100.

For example, the client devices 102A-N can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, a wearable device, a head mounted device, a smart watch, a goggle, a smart glasses, a smart contact lens, and/or any other portable, mobile, hand held devices, etc. The input mechanism on client devices 102A-N can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), eye tracking, eye detection, pupil tracking/detection, or a combination of the above.

The client devices 102A-N, application publisher/developer 108A-N, its respective networks of users, a third party content provider 112, and/or promotional content server 114, can be coupled to the network 106 and/or multiple networks. In some embodiments, the devices 102A-N and host server 100 may be directly connected to one another. The alternate, augmented provided or developed by the application publisher/developer 108A-N can include any digital, online, web-based and/or mobile based environments including enterprise applications, entertainment, games, social networking, e-commerce, search, browsing, discovery, messaging, chatting, and/or any other types of activities (e.g., network-enabled activities).

In one embodiment, the host server 100 is operable to generate a fingerprint of a physical location for placement of virtual objects associated with the physical location, (e.g., as depicted or deployed via user devices 102A-N).

In one embodiment, the disclosed framework further includes systems and processes for enhancing the web and its features with augmented reality. Example components of the framework can include:

- Browser (mobile browser, mobile app, web browser, etc.)
- Servers and namespaces the host (e.g., host server 100 can host the servers and namespaces. The content (e.g, VOBs, any other digital object), applications running on, with, or integrated with the disclosed platform can be created by others (e.g., third party content provider 112, promotions content server 114 and/or application publisher/developers 108A-N, etc.).
- Advertising system (e.g., the host server 100 can run an advertisement/promotions engine through the platform and any or all deployed augmented reality, alternate reality, mixed reality or virtual reality environments)
- Commerce (e.g., the host server 100 can facilitate transactions in the network deployed via any or all deployed augmented reality, alternate reality, mixed reality or virtual reality environments and receive a cut. A digital token or digital currency (e.g., crypto currency) specific to the platform hosted by the host server 100 can also be provided or made available to users.)
- Search and discovery (e.g., the host server 100 can facilitate search, discovery or search in the network deployed via any or all deployed augmented reality, alternate reality, mixed reality or virtual reality environments)
- Identities and relationships (e.g., the host server 100 can facilitate social activities, track identifies, manage, monitor, track and record activities and relationships between users 116A).

Figure 3A:
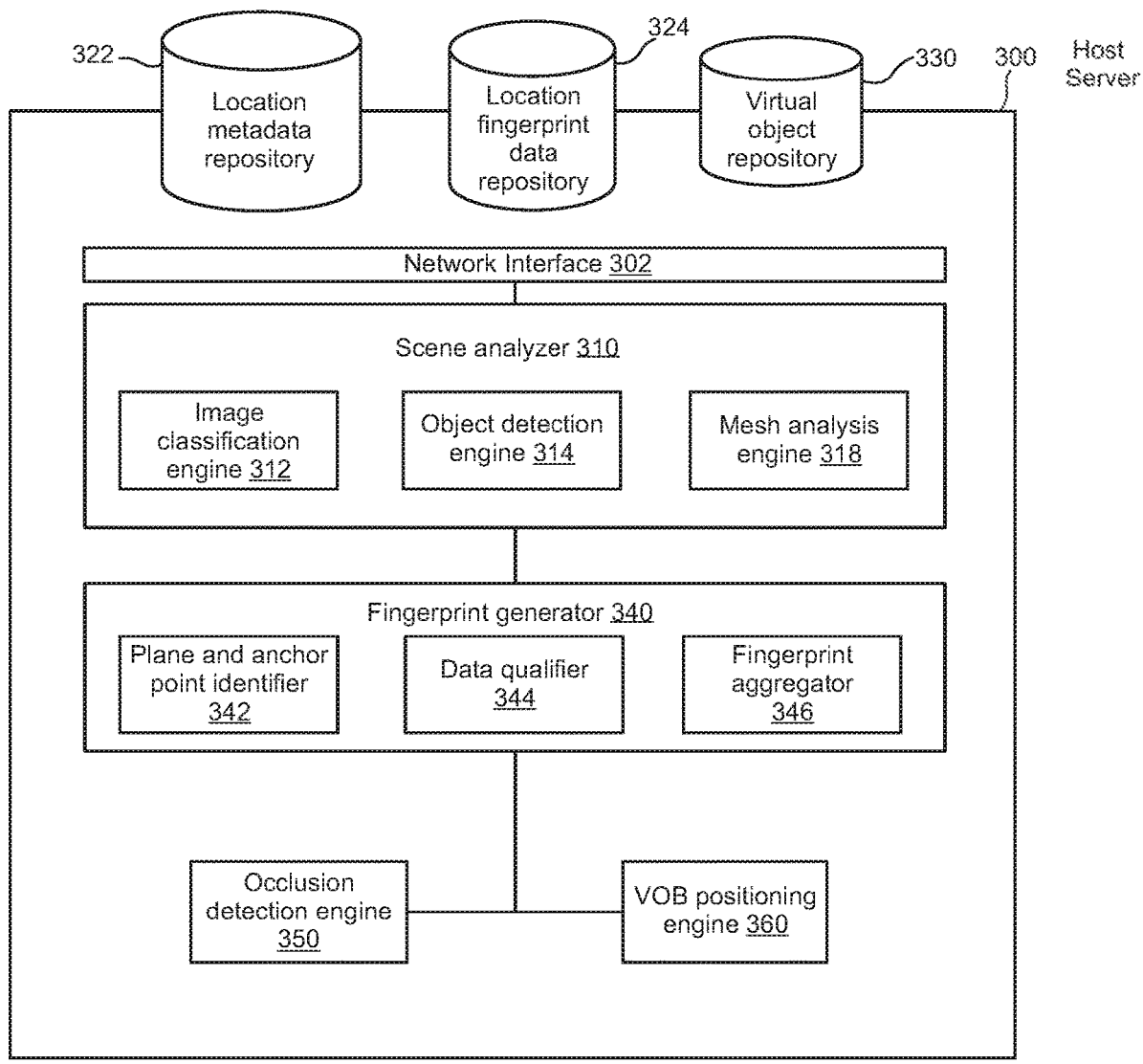
FIG. 3A depicts an example functional block diagram of a host server to generate a fingerprint of a physical location for placement of virtual objects associated with the physical location, in accordance with embodiments of the present disclosure.
Figure 3B:
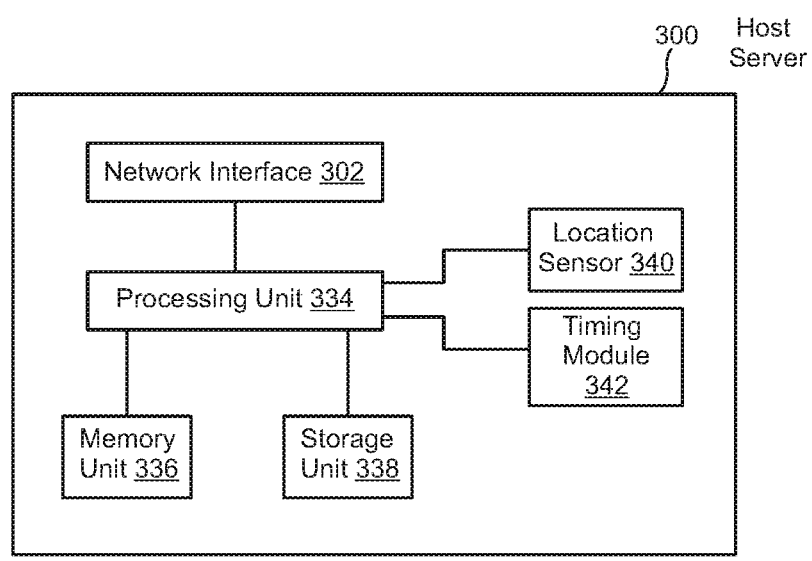
FIG. 3B depicts an example block diagram illustrating the components of the host server to generate a fingerprint of a physical location for placement of virtual objects associated with the physical location, in accordance with embodiments of the present disclosure.

Functions and techniques performed by the host server 100 and the components therein are described in detail with further references to the examples of FIG. 3A-3B.

In general, network 106, over which the client devices 102A-N, the host server 100, and/or various application publisher/provider 108A-N, content server/provider 112, and/or promotional content server 114 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102A-N and the host server 100 and may appear as one or more networks to the serviced systems and devices. In one embodiment, communications to and from the client devices 102A-N can be achieved by an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, 5G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The host server 100 may include internally or be externally coupled to a user repository 128, a virtual object repository 130, a location fingerprint data repository 124, a location metadata repository 122 and/or a device location repository 132. The repositories can store software, descriptive data, images, system information, drivers, and/or any other data item utilized by other components of the host server 100 and/or any other servers for operation. The repositories may be managed by a database management system (DBMS), for example but not limited to, Oracle, DB2, Microsoft Access, Microsoft SQL Server, PostgreSQL, MySQL, FileMaker, etc.

The repositories can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In some embodiments, the host server 100 is able to generate, create and/or provide data to be stored in the user repository 128, the virtual object (VOB) repository 130, the location fingerprint data repository 124, the location metadata repository 122 and/or a device location repository 132. The user repository 128 a can store user information, user profile information, demographics information, analytics, statistics regarding human users, user interaction, brands advertisers, virtual object (or 'VOBs'), access of VOBs, usage statistics of VOBs, ROI of VOBs, etc.

The virtual object repository 130 can store virtual objects and any or all copies of virtual objects. The VOB repository 130 can store virtual content or VOBs that can be retrieved for consumption in a target environment, where the virtual content or VOBs are contextually relevant. The VOB repository 130 can also include data which can be used to generate (e.g., generated in part or in whole by the host server 100 and/or locally at a client device 102A-N) contextually-relevant or aware virtual content or VOB(s).

The device location repository 132 can store physical locations of various client devices 102 that are on the network or utilize the host server 100. The location metadata repository 122 can store metadata or other information regarding physical locations in the system or all locations in the world. The location fingerprint data repository 124 can store fingerprint data generated, created or identified for physical locations in the world.

Figure 2A:
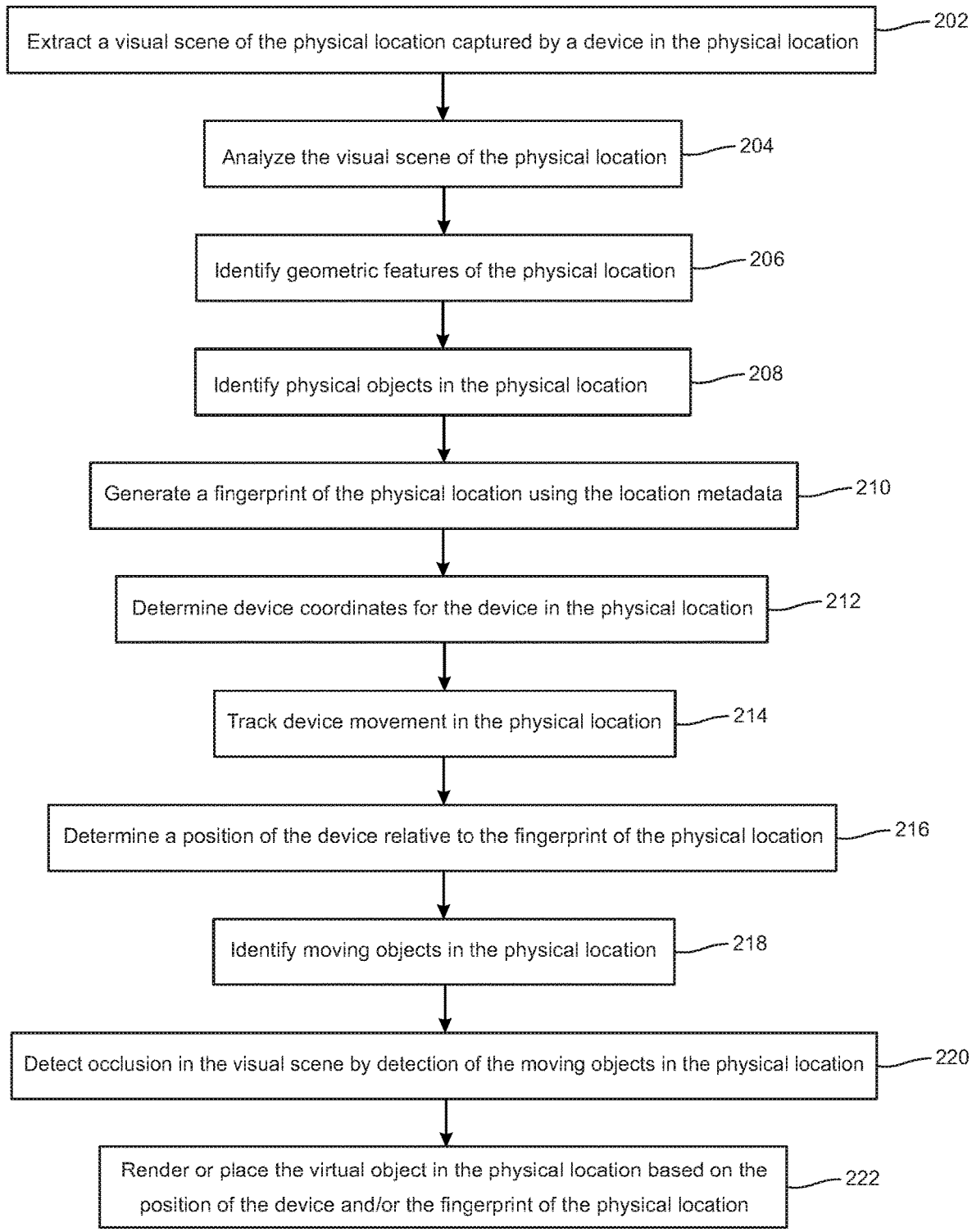
FIG. 2A depicts a flow chart illustrating an example process to analyze a visual scene for virtual object placement, in accordance with embodiments of the present disclosure.

FIG. 2A depicts a flow chart illustrating an example process to analyze a visual scene for virtual object placement, in accordance with embodiments of the present disclosure.

In process 202, a visual scene of the physical location captured by a device in the physical location is extracted. In general, the physical location can be indoors or outdoors. In some instances, the physical location is subdivided into multiple blocks and the visual scene is extracted from one of the multiple blocks. In process 204, the visual scene of the physical location is analyzed. In process 206, geometric features of the physical location are identified.

Embodiments of the present disclosure, further include, detecting a wall or a ceiling to identify the geometric features of the physical location and/or specifying or updating one or more anchor points for the wall upon detecting the wall. Additionally, a texture can be identified from analyzing the visual scene to detect physical features in the visual scene. The texture can identified from machine learning training.

In process 208, physical objects in the physical location are identified. One embodiment includes using sizes known to a learning system or a machine learning algorithm to identify the physical objects. For example, the sizes that are known or that can be trained include, sizes of an AC outlet, a light switch and a smoke detector. In addition, repeating patterns on the wall or the ceiling can be detected using the physical objects identified. A distance to the wall or the ceiling can also be determined using the physical objects.

One embodiment further includes, detecting stationary edges in the visual scene and/or using the stationary edges to further identify stationary objects in the physical location. Stationary objects can include, for example, a table, furniture, fixtures, a wall, decorations, architectural features and/or landscape features. In one embodiment, the stationary objects can be used to generate a fingerprint of the physical location.

In process 210, a fingerprint of the physical location is generated using the location metadata. In general, the location metadata can include, one or more of, the geometric features and the physical objects. One embodiment includes collecting additional location metadata about the physical location using analysis performed by other devices in the physical location and/or updating the finger print of the physical location using the additional metadata. The additional location metadata can include information associated with the geometric features in the physical location. The additional location metadata can also include information associated with relative positions or motions of the users of the other devices in the physical location.

One embodiment includes, enabling direct sharing of location metadata aggregated by multiple devices in the physical location among the multiple devices using multipeer connectivity using Wi-Fi or Bluetooth. The location metadata aggregated by the multiple devices can be transmitted to a remote server or remote database.

Moreover, the fingerprint of the physical location can include a visual fingerprint and the acoustic fingerprint. One embodiment further includes, generating an acoustic fingerprint of the physical location through performing audio analysis to identify rooms in the physical location. For example, echolocation can be used in the audio analysis to compute and determine a distance to a wall in the physical location. In one embodiment, a microphone on the device in the physical location is used to detect or record audio signals used in the audio analysis.

In one embodiment, the fingerprint of the physical location is updated using an SSID or a signal strength of a wireless network accessible in the physical location. One embodiment includes, generating markers using the fingerprint of the physical location for an augmented reality platform to associate the virtual object with a given place in the physical location. Additionally, the fingerprint of the physical location can also be updated using GPS location data associated with the physical location and/or a map API relevant to the physical location.

In process 212, device coordinates are determined for the device in the physical location. The device coordinates can include current device coordinates and/or last known device coordinates. In process 214, device movement in the physical location are tracked. In one embodiment, the device movement of the device is determined using dead reckoning via an accelerometer or a barometer. A position of the device can be determined relative to the fingerprint of the physical location, in process 216. In addition, a position of the sun or the moon in the sky can be detected to for example, determine an orientation of the physical location in the visual scene using the position of the sun or the moon.

In process 218, moving objects are identified in the physical location. In process 220, occlusion is detected in the visual scene by detection of the moving objects in the physical location. In process 222, the virtual object is rendered or placed in the physical location based on the position of the device and/or the fingerprint of the physical location. Further embodiments include generating and storing a set of location fingerprints in the physical locations and another physical location by: collecting the location metadata aggregated by the multiple devices in the physical location and/or collecting additional location metadata aggregated by additional devices in another physical location.

Figure 2B:
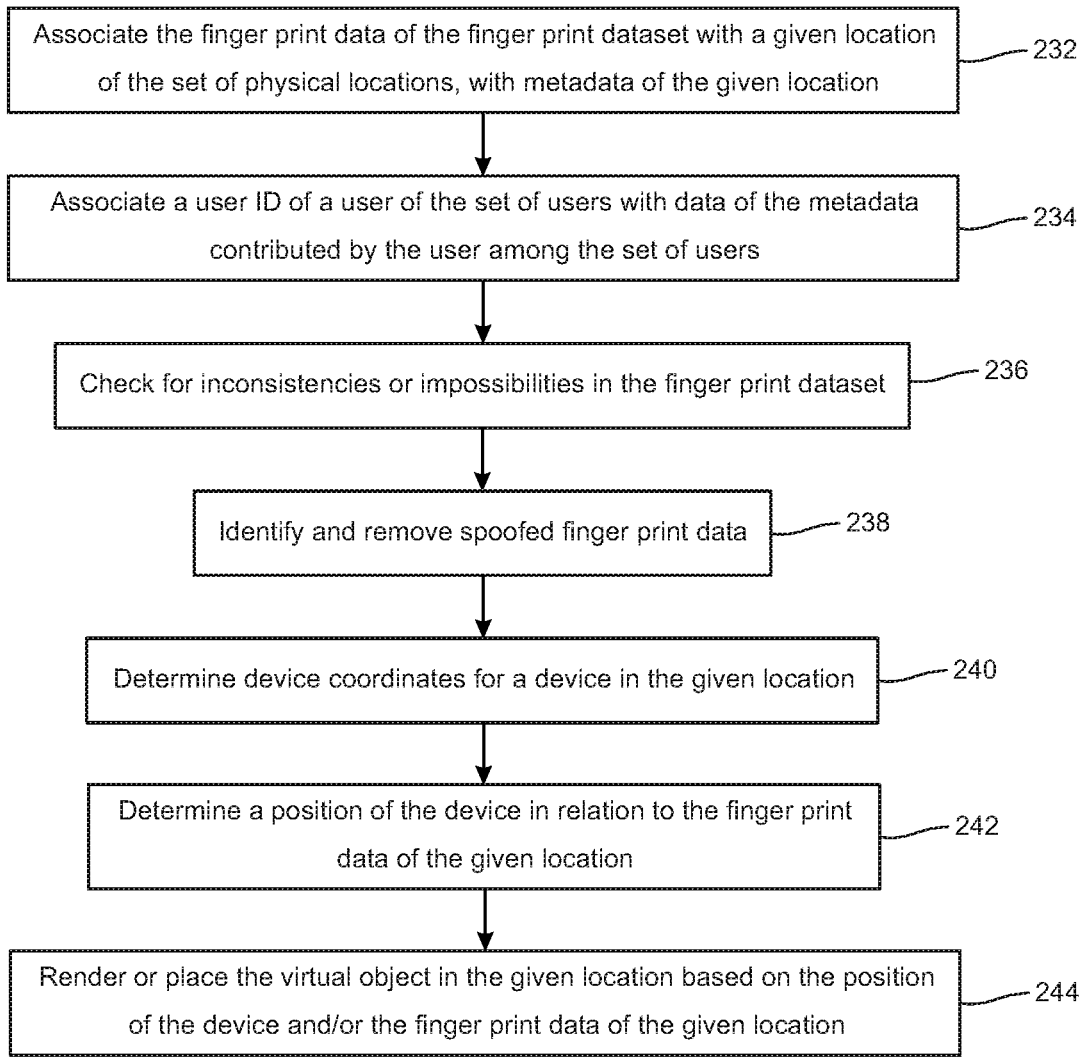
FIG. 2B depicts a flow chart illustrating an example process to use fingerprint data for virtual object placement, in accordance with embodiments of the present disclosure.

FIG. 2B depicts a flow chart illustrating an example process to use fingerprint data for virtual object placement, in accordance with embodiments of the present disclosure.

In process 232, the finger print data of the fingerprint dataset is associated with a given location of the set of physical locations with metadata of the given location. The finger print data associated with the given location is used for placement or positioning of a virtual object in the given location by the augmented reality application. Note that the finger print data of the set of physical locations can be extracted or generated from recorded videos or captured images.

In addition, finger print data of the set of physical locations can be received from devices located in the set of physical locations. For example, the devices can be deployed to the set of physical locations. The devices can include, for example, one or more of, a security camera, a dashcam, a body cam, a television camera, a drone-based camera, an airborne camera, and/or a satellite or satellite camera. The devices can also be fixtures associated with the set of physical locations.

In process 234, a user ID of a user of the set of users is associated with data of the metadata contributed by the user among the set of users. The metadata of the given location can include one or more of, name of location, floor of building, type of location, room or room number, a tag, an address, a geographic location. The metadata can be added manually by a set of users or crowdsourced from the set of users through rewarding the set of users.

In process 236, inconsistencies or impossibilities are checked for in the fingerprint dataset. Spoofed finger print data is identified and removed in process 238. In process 240, device coordinates are determined for a device in the given location 240. In process a position of the device in relation to the fingerprint data of the given location is determined 242. In process 244, the virtual object is rendered or placed in the given location based on the position of the device and/or the fingerprint data of the given location.

Figure 2C:
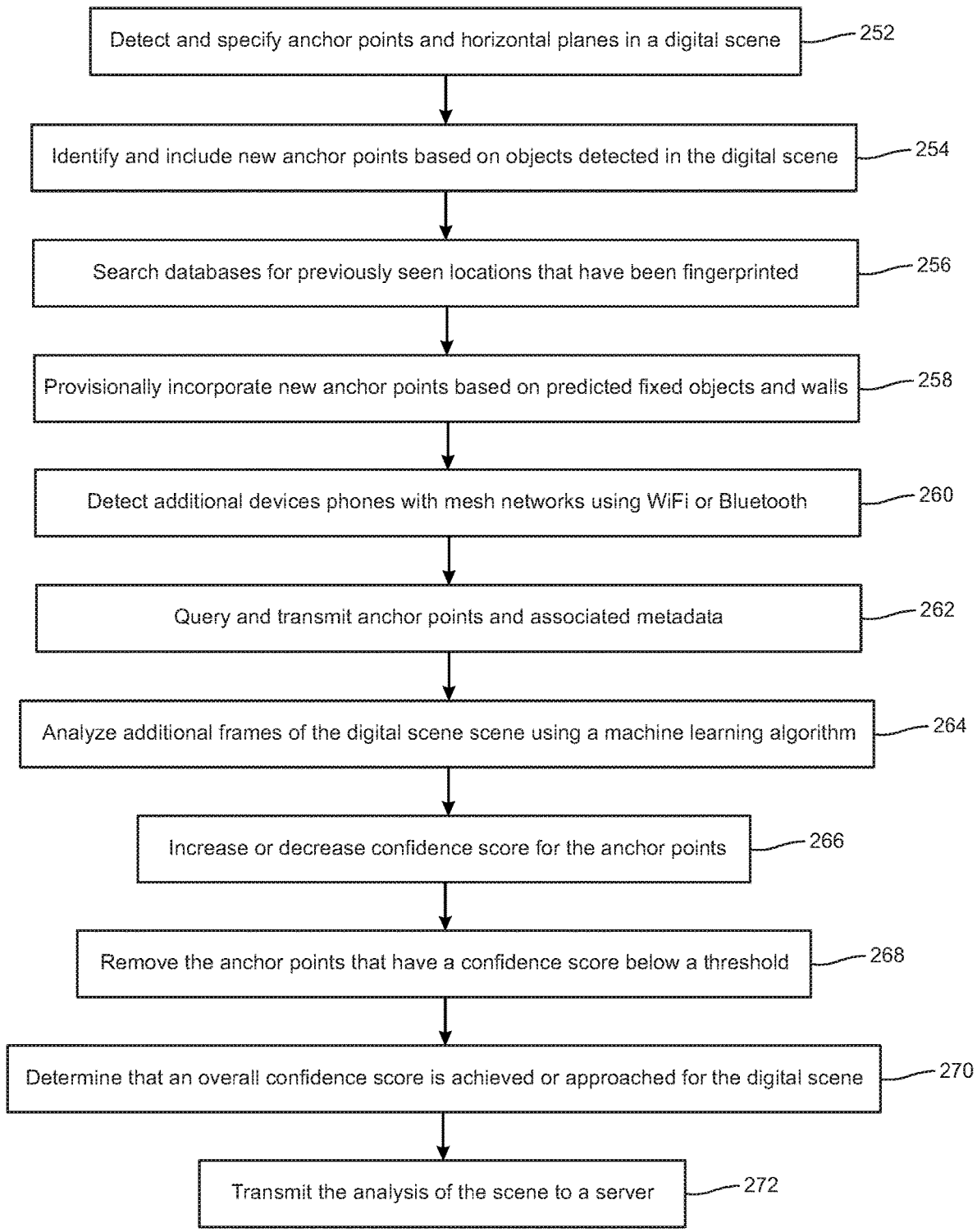
FIG. 2C depicts a flow chart illustrating an example process for identifying and specifying anchor points to generate a fingerprint of a digital scene, in accordance with embodiments of the present disclosure.

FIG. 2C depicts a flow chart illustrating an example process for identifying and specifying anchor points to generate a fingerprint of a digital scene, in accordance with embodiments of the present disclosure.

In process 252, the system can detect and specify anchor points and horizontal planes in a digital scene. In process 256, the system identifies and includes new anchor points based on objects detected in the digital scene.

Databases are queried for previously seen locations that have been fingerprinted, in process 258. In process 260, new anchor points are provisionally incorporated based on predicted fixed objects and walls. In process 262, additional devices phones can be detected with mesh networks using WiFi or Bluetooth. The system can query and transmit anchor points and associated metadata in process 264 and analyze additional frames of the digital scene scene using a machine learning algorithm 266. In process 268, the confidence score can be increased or decreased for the anchor points. In one embodiment, the anchor points that have a confidence score below a threshold is removed in process 270. Once it is determined that an overall confidence score is achieved or approached for the digital scene, as in process 272, the analysis of the scene can be stored and/or sent to a server, in process 274.

FIG. 3A depicts an example functional block diagram of a host server 300 to generate a fingerprint of a physical location for placement of virtual objects associated with the physical location, in accordance with embodiments of the present disclosure.

The host server 300 includes a network interface 302, a scene analyzer 310, a fingerprint generator 340, an occlusion detection engine 350 and/or a virtual object (VOB) positioning engine 360. The host server 300 is also coupled to a location metadata repository 322, a location fingerprint data repository 324 and/or a virtual object repository 330. Each of the scene analyzer 310, the fingerprint generator 340, the occlusion detection engine 350 and/or the VOB positioning engine 360, can be coupled to each other.

One embodiment of the scene analyzer 310 includes, an image classification engine 312, an object detection engine 314 and/or a mesh analysis engine 318. One embodiment of the fingerprint generator 340 includes, a plane and anchor point identifier 342, a data qualifier 344 and/or a fingerprint aggregator 346.

Additional or less modules can be included without deviating from the techniques discussed in this disclosure. In addition, each module in the example of FIG. 3A can include any number and combination of sub-modules, and systems, implemented with any combination of hardware and/or software modules.

The host server 300, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

The network interface 302 can be a networking module that enables the host server 300 to mediate data in a network with an entity that is external to the host server 300, through any known and/or convenient communications protocol supported by the host and the external entity. The network interface 302 can include one or more of a network adaptor card, a wireless network interface card (e.g., SMS interface, WiFi interface, interfaces for various generations of mobile communication standards including but not limited to 1G, 2G, 3G, 3.5G, 4G, LTE, 5G, etc.), Bluetooth, a router, an access point, a wireless router, a switch, a multilayer switch, a protocol converter, a gateway, a bridge, bridge router, a hub, a digital media receiver, and/or a repeater.

As used herein, a "module," a "manager," an "agent," a "tracker," a "handler," a "detector," an "interface," or an "engine" includes a general purpose, dedicated or shared processor and, typically, firmware or software modules that are executed by the processor. Depending upon implementation-specific or other considerations, the module, manager, tracker, agent, handler, or engine can be centralized or have its functionality distributed in part or in full. The module, manager, tracker, agent, handler, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, flash, optical storage, to name a few), but may or may not be limited to hardware.

One embodiment of the host server 300 includes the scene analyzer 310 having, the image classification engine 312, the object detection engine 314 and/or the mesh analysis engine 318. The scene analyzer 310 can be any combination of software agents and/or hardware modules (e.g., including processors and/or memory units) able to detect, capture, extract a digital scene from an image, photo, an illustration, a rendering and/or via a frame or several frames of a live video or recorded video.

One embodiment of the scene analyzer 310 further includes, software agents and/or software modules that include APIs that can run image classifier algorithms (e.g., via the image classification engine 312) against the scenes, videos and/or camera frames. The object detection engine 314 can then detect, recognize and/or identify physical objects in the digital scene. Embodiments of the present disclosure further include training & deploying an object detection model (e.g., by the object detection engine 314) for the host server 300. Image data sets (e.g., with bounding boxes) can also be used to train a model for the objects.

A further embodiment of the scene analyzer 310 includes software agents and/or hardware modules (e.g., the mesh analysis engine 318) that include a Geolocation API provide services for determining a device's position (e.g., absolute position) using GPS/GLONASS, iBeacon triangulation, Wi-Fi AP triangulation, and/or cell tower triangulation.

One embodiment of the host server 300 includes the fingerprint generator 340 includes, a plane and anchor point identifier 342, a data qualifier 344 and/or a fingerprint aggregator 346.

The fingerprint generator 340 can be any combination of software agents and/or hardware modules (e.g., including processors and/or memory units) able to create, generate, update, modify, retire location fingerprints of a physical location or multiple physical locations using analysis of a digital scene from an image, photo, an illustration, a rendering and/or via a frame or several frames of a live video or recorded video.

One embodiment of the fingerprint generator 340 further includes software agents and/or hardware modules (e.g., the plane and anchor point identifier 342) that can perform motion tracking, horizontal plane detection, vertical plane detection, light estimation, anchor point and/or anchor plane detection & updating.

The fingerprint generator 340 is able to take a set of 2D bounding boxes (from the output of the trained Tensorflow model running locally on a device from each frame out of the camera, and turn them into a 3D bounding box (within the ARSession) that the system can use as part of the fingerprint memory of the environment. The host server 300 can extend beyond the relative positioning system & the occlusion (e.g., as determined and identified by the occlusion detection engine 350). For example, by remembering or indexing the fingerprints of the objects in each scene (room or outdoor area with visible objects) in an efficient way, the system can generate, in real time or near real time, memory of situational awareness which can be retained for any amount of time or permanently.

The fingerprint generator 340 is in one embodiment, able to generate computer vision based 3D fingerprinting and mapping of locations. One embodiment includes generating a stored profile (3D fingerprint) of a physical location (a room or an outdoor place) by using computer vision to analyze the visual scene, geometry, features, and objects that appear to a camera or video camera on a device such as a mobile phone camera. Rooms can be hierarchical (nested inside larger spaces). Outdoor environments can be subdivided into blocks of fixed size (e.g. 10×10×10 meters) for storage purposes.

The plane and anchor point identifier 342 can also use computer vision to detect walls; or update wall anchor points. Additionally, known object sizes (e.g., AC outlets, light switches, smoke detectors) can be used to detect distance to surfaces/walls. In one example, known object sizes can be mapped onto walls or ceilings to detect repeating patterns on walls or other surfaces, to use to calculate distances to other surfaces without objects of known size.

The host server 300 can use computer vision to detect stationary object edges (tables, furniture, walls, decorations, architectural features, landscape features or non-moving physical objects) to use to fingerprint a room or location for future recognition (e.g., by the object detection engine 314 and/or the fingerprint generator 340).

The scene analyzer 310 can further use computer vision to identify novel textures & object types Note the system can train the machine learning model using a large body of images tagged with bounding boxes for the items in the image. e.g. markers such as QR codes or barcodes, augmented reality markers, objects or textures that are identified from prior machine learning training, physical features or objects such as a brick wall, wooden table, potted plant, type of foliage, wallpapers, artworks, light fixture, stop sign or other signage, railings, ramps, stairs or steps, visible plumbing or wiring, fire extinguishers, elevators, shelves, book cases, drawers, cabinets, loading bays, containers, trash bins, desks, chairs, tables, counters, dividers, office cubicles, office equipment, factory or industrial equipment, etc. In one embodiment, fuzzy matching can be used to identify places seen previously, to enable precise relative object placement when GPS location is inaccurate or not available.

Doors, door frames, windows, window frames, and mirrors, mouldings, carpets, can be detected or identified using heuristics. The host server 300 can preprocess the model (e.g., by the object detection engine 314) to remove reflections or to ignore shadows before processing via machine learning model. The host server 300 can movement of humans and other moving objects within the frame, for example through, use of moving objects for occlusion detection in the frame.

For example, for each object detected, the object detection engine 314 can categorize it as either "furniture" (unlikely to move), "movable" (chairs, pens, purses, etc.), or "alive" (animals, humans, robots). The categories are useful to share in real time with other users, and "furniture" and the count of big movables that are likely to stay in a room (chairs, beanbag chairs, etc.) can be persisted in the host server 300. In one embodiment, the scenario of adding & removing chairs from a room can be used to differentiate between adjacent, nearly identical, office rooms. The scene analyzer 310 can also detect position of the sun and moon in the sky, for example, through windows, balconies, or outdoors, and use for orientation. The host server 300, in one embodiment, can predict the exact position of the Sun and Moon for any given time, latitude, and longitude.

In a further embodiment, the scene analyzer 310 performs audio analysis. Audio analysis can include, for example, passive listening and/or active echolocation to identify rooms (based on acoustics or unusual audio sources) and measure distances to walls (echolocation). Precision of echo measurement can be determined by audio sample rate & microphone placements on device. iOS allows individual microphones to be recorded. This can add additional layers of data to the 3D fingerprint of a location (not just the visual fingerprint, but the acoustic fingerprint of a location as well).

The scene analyzer 310 can also use visual perspective transforms to crop images of textures of individual objects and walls to identify with machine learning, or to save in compressed form to be able to generate a realistic 3D version of the real-world scene later (e.g., by the VOB positioning engine 360). Camera data can be used to save and learn (e.g., by the scene analyzer) a particular feature of a location to use as a marker for augmented reality. Note that Local data store on a client device can be used to cache objects detected or identified.

In a further embodiment, the host server 300 can use mesh networking (e.g., by the mesh analysis engine 318 and/or the fingerprint aggregator 346) among nearby devices to collect additional data and metadata about features in the physical location. The mesh analysis engine 318 can also collect data about the relative positions and motion of people and their devices in the location. For example, SSIDs and signal strengths of nearby wireless networks can be used to add further data and metadata to the 3D fingerprint of a location (e.g., via the data qualifier 340 and/or the fingerprint aggregator 346).

GPS location data can be used by the fingerprint generator 340 to add further data and metadata to the 3D fingerprint of a location. In addition, data from maps of a location (such as via map APIs) can also be used (e.g., by the fingerprint aggregator 346) to collect further data and metadata into the 3D fingerprint of a location.

The fingerprint generator 340 can create and maintain a database (e.g., the location fingerprint data repository 324) of location fingerprints (e.g., 3d location fingerprints) and metadata (e.g., the location metadata repository 322). For instance, 3D fingerprinting data cab be aggregated on a server (e.g., by the fingerprint aggregator 346) to build and maintain a database of 3D fingerprints for a set of locations in the physical world. Additionally, the host server 300 can leverage multi-peer connectivity, or other such similar frameworks for ad-hoc mesh networks using Wi-Fi or Bluetooth to transfer data.

The host server 300 can enable sharing of location info between devices directly, to reduce the load on the server or the data usage of users. The host server 300 can further utilize a proprietary protocol for compatibility with Android and devices like hovering drones, which can send the system camera data, sometimes in stereo to crowdsource object detection & positioning information from other devices running augmented reality software at the same time.

The host server 300 can upload the relative positions (along with GPS location) for stationary objects to databases (e.g., the location metadata repository 322, location fingerprint data repository 324) for use by other devices. The fingerprint generator 340 can also detect spoofed/false data (e.g., by the data qualifier 344) by checking for impossible data, or data that doesn't match other, trusted users. In some instances, ID of users submitting data are stored so that contributed data can be removed for a malicious user.

The host server 300 also associates 3D fingerprint data about a location with metadata about the location (name of location, floor of building, type of location, room or room number, tags, address, geographic location, etc.). The metadata can be added manually by users, or it can be crowd-sourced by rewarding users or asking them to add it. The metadata can also be system determined and/or added from other applications or derived by inference and contextual cues from the user's device and behavior.

In one embodiment, the host server 300 is able to crowd-source user or device contributions to the 3D fingerprint database for example, by using a reward system to encourage users to "paint" real-world scenes that have not been visited yet, or to help to measure a location with others, or to re-visit a location that needs to be measured again.

For example, the fingerprint aggregator 346 can gather fingerprint data (e.g., 3D location fingerprint data) from imaging devices (e.g., cameras) that are deployed to a location by mapping teams, or that are already in the location (security cameras, dash cams, body cams, television cameras, drone-based or airborne cameras, satellite cameras). The fingerprint data can also be gathered from recorded video footage or photographs. The video or photos can be contributed voluntarily or solicited (such as via social media). The video or photos can also be capture from deploying agents (e.g., on demand) to contribute via a crowdsourcing system or process.

A further embodiment of the host server 300 includes the VOB positioning engine 360. The VOB positioning engine 360 can be any combination of software agents and/or hardware modules (e.g., including processors and/or memory units) able to render, generate, display, place, position, locate, orient virtual objects in a physical location using fingerprint data of a physical location.

The VOB positioning engine 360 can place and/or render virtual objects at more precise locations in a physical location, relative to the fingerprint of the location. The VOB positioning engine 360 can, for instance, store and/or retrieve virtual object placement on server as X, Y, Z location and user device relative location with respect to stationary anchor points & objects in location (fingerprint of location). The VOB positioning engine 360 can further use the 3D fingerprint of a location plus the user's current or last known device coordinates, to accurately render virtual objects in the correct relative positions to other virtual objects and to the physical features of the location and to the last known, current or changing position of the user's device. In one embodiment, dead-reckoning is used on a user's device, based on sensors such as an accelerometer and barometer, to infer movement of the user's device at a location, in order to estimate the user's position relative to a map and/or the fingerprint of the location.

A further embodiment of the host server 300 includes the occlusion detection engine 350. The occlusion detection engine 350 is able to detect or identify virtual object occlusion through location fingerprinting. In one embodiment, local or remote fingerprints of a location are used to enable, or improve accuracy of, visual occlusion of nearby virtual objects by real or virtual objects that move or appear between a device and the relative or absolute location of a virtual object. Objects that can occlude a virtual object include moving objects such as other people or vehicles, or non-moving objects or features of the environment such as trees or architectural features.

Occlusion can take place when the user's device is stationary and movement takes place by real and/or virtual objects in the camera frame, or when the user moves or they move their device thus causing both non-moving and moving objects in the environment to appear to change position in the camera frame as a result of movement of the user's device. For example, when the user shifts perspective or camera angle and/or distance, the objects in the frame may not actually change position in physical space).

To identify occlusion, the occlusion detection engine 350 can detect movement of humans and other moving objects within the frame and use the moving objects for occlusion detection. Machine learning models can be used to draw outlines around shapes to form silhouette stencils to allow the camera image to draw on top. One embodiment includes storing, indexing, and retrieval of a detailed visual memory of a scene. For example, scenes can be indexed by type of object recognized (by Mask R-CNN or similar image segmentation algorithm), by location, and by time recorded. The benefit is that users can search by object to find missing keys, eyeglasses, etc.

The host server 300 can additionally incorporate the previous items, along with stored textures from the scene, transformed to remove perspective. For example, the host server 300 can record a 2D surface image of the detected objects. For square or rectangular objects, the system can remove perspective by stretching or compressing the image data until it fits an expected proportions. The host server 300 can assist users to find misplaced objects. Objects can be automatically classified by type by the image segmentation algorithm as part of object detection. The user of the app can for example, name a particular object, in which case the system can train a machine learning model to recognize the specific object, and/or recognize by comparing to similarity with a saved 2D surface image. For humans and pets, the host server 300 can perform facial recognition.

FIG. 3B depicts an example block diagram illustrating the components of the host server 300 to generate a fingerprint of a physical location for placement of virtual objects associated with the physical location, in accordance with embodiments of the present disclosure.

In one embodiment, host server 300 includes a network interface 302, a processing unit 334, a memory unit 336, a storage unit 338, a location sensor 340, and/or a timing module 342. Additional or less units or modules may be included. The host server 300 can be any combination of hardware components and/or software agents to place of virtual objects associated with the physical location. The network interface 302 has been described in the example of FIG. 3A.

One embodiment of the host server 300 includes a processing unit 334. The data received from the network interface 302, location sensor 340, and/or the timing module 342 can be input to a processing unit 334. The location sensor 340 can include GPS receivers, RF transceiver, an optical rangefinder, etc. The timing module 342 can include an internal clock, a connection to a time server (via NTP), an atomic clock, a GPS master clock, etc.

The processing unit 334 can include one or more processors, CPUs, microcontrollers, FPGAs, ASICs, DSPs, or any combination of the above. Data that is input to the host server 300 can be processed by the processing unit 334 and output to a display and/or output via a wired or wireless connection to an external device, such as a mobile phone, a portable device, a host or server computer by way of a communications component.

One embodiment of the host server 300 includes a memory unit 336 and a storage unit 338. The memory unit 335 and a storage unit 338 are, in some embodiments, coupled to the processing unit 334. The memory unit can include volatile and/or non-volatile memory. In virtual object deployment, the processing unit 334 may perform one or more processes related to rendering and/or placement of virtual objects associated with the physical location.

In some embodiments, any portion of or all of the functions described of the various example modules in the host server 300 of the example of FIG. 3A can be performed by the processing unit 334.

Figure 4A:
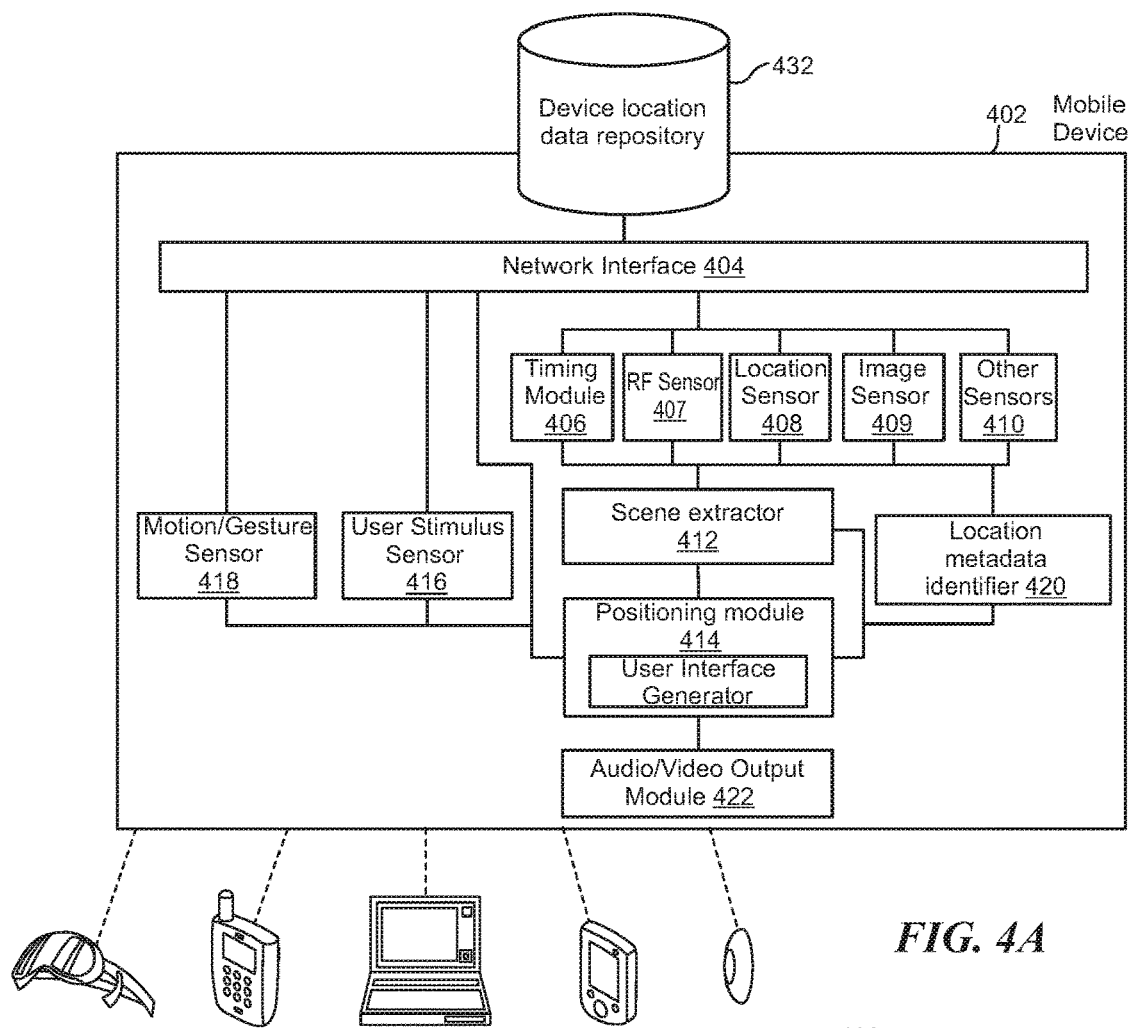
FIG. 4A depicts an example functional block diagram of a client device such as a mobile device to capture a visual scene for use in generating a fingerprint of a physical location for placement of virtual objects associated with the physical location, in accordance with embodiments of the present disclosure.

FIG. 4A depicts an example functional block diagram of a client device 402 such as a mobile device to capture a visual scene for use in generating a fingerprint of a physical location for placement of virtual objects associated with the physical location, in accordance with embodiments of the present disclosure.

The client device 402 includes a network interface 404, a timing module 406, an RF sensor 407, a location sensor 408, an image sensor 409, an opacity adaptor/controller 412, a transition module 414, a user stimulus sensor 416, a motion/gesture sensor 418, a virtualness adjustor 420, an audio/video output module 422, and/or other sensors 410. The client device 402 may be any electronic device such as the devices described in conjunction with the client devices 102A-N in the example of FIG. 1 including but not limited to portable devices, a computer, a server, location-aware devices, mobile phones, PDAs, laptops, palmtops, iPhones, cover headsets, heads-up displays, helmet mounted display, head-mounted display, scanned-beam display, smart lens, monocles, smart glasses/goggles, wearable computer such as mobile enabled watches or eyewear, and/or any other mobile interfaces and viewing devices, etc.

In one embodiment, the client device 402 is coupled to a reality object repository 432. The reality object repository 432 may be internal to or coupled to the mobile device 402 but the contents stored therein can be further described with reference to the example of the device location data repository 132.

Additional or less modules can be included without deviating from the novel art of this disclosure. In addition, each module in the example of FIG. 4A can include any number and combination of sub-modules, and systems, implemented with any combination of hardware and/or software modules.

The client device 402, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

In the example of FIG. 4A, the network interface 404 can be a networking device that enables the client device 402 to mediate data in a network with an entity that is external to the host server, through any known and/or convenient communications protocol supported by the host and the external entity. The network interface 404 can include one or more of a network adapter card, a wireless network interface card, a router, an access point, a wireless router, a switch, a multi-layer switch, a protocol converter, a gateway, a bridge, bridge router, a hub, a digital media receiver, and/or a repeater.

According to the embodiments disclosed herein, the client device 402 can render and/or place virtual objects associated with the physical location.

The client device 402 can provide functionalities described herein via a consumer client application (app) (e.g., consumer app, client app. Etc.). The consumer application includes a scene extractor 412 that captures and/or extracts a scene for analysis to generate location fingerprints. The location metadata identifier 420 can for example associate location fingerprints to metadata of a given location. The positioning module 414 can place, position and/or render a virtual object in relation to or based on fingerprint data generated or retrieved for a given physical location.

Figure 4B:
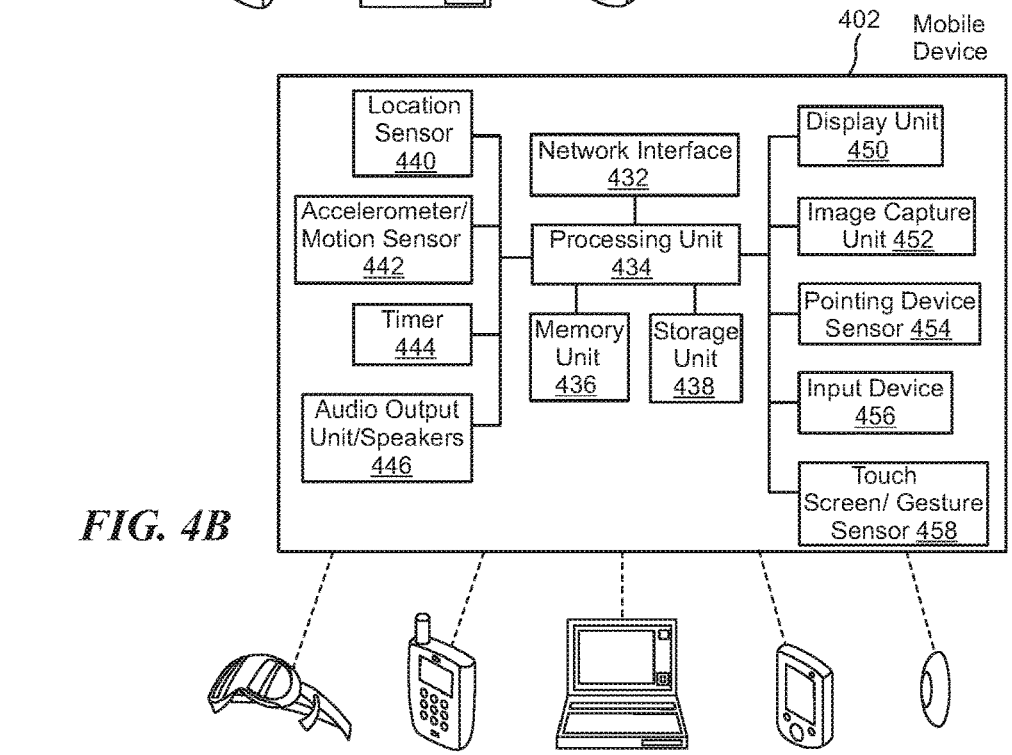
FIG. 4B depicts an example block diagram of the client device, which can be a mobile device that captures a visual scene for use in generating a fingerprint of a physical location for placement of virtual objects associated with the physical location, in accordance with embodiments of the present disclosure.

FIG. 4B depicts an example block diagram of the client device 402, which can be a mobile device that captures a visual scene for use in generating a fingerprint of a physical location for placement of virtual objects associated with the physical location, in accordance with embodiments of the present disclosure.

In one embodiment, client device 402 (e.g., a user device) includes a network interface 432, a processing unit 434, a memory unit 436, a storage unit 438, a location sensor 440, an accelerometer/motion sensor 442, an audio output unit/speakers 446, a display unit 450, an image capture unit 452, a pointing device/sensor 454, an input device 456, and/or a touch screen sensor 458. Additional or less units or modules may be included. The client device 402 can be any combination of hardware components and/or software agents for capturing a visual scene for use in generating a fingerprint of a physical location for placement of virtual objects associated with the physical location. The network interface 432 has been described in the example of FIG. 4A.

One embodiment of the client device 402 further includes a processing unit 434. The location sensor 440, accelerometer/motion sensor 442, and timer 444 have been described with reference to the example of FIG. 4A.

The processing unit 434 can include one or more processors, CPUs, microcontrollers, FPGAs, ASICs, DSPs, or any combination of the above. Data that is input to the client device 402 for example, via the image capture unit 452, pointing device/sensor 454, input device 456 (e.g., keyboard), and/or the touch screen sensor 458 can be processed by the processing unit 434 and output to the display unit 450, audio output unit/speakers 446 and/or output via a wired or wireless connection to an external device, such as a host or server computer that generates and controls access to simulated objects by way of a communications component.

One embodiment of the client device 402 further includes a memory unit 436 and a storage unit 438. The memory unit 436 and a storage unit 438 are, in some embodiments, coupled to the processing unit 434. The memory unit can include volatile and/or non-volatile memory. In rendering or presenting an augmented reality environment, the processing unit 434 can perform one or more processes related to generating a fingerprint of a physical location for placement of virtual objects associated with the physical location.

In some embodiments, any portion of or all of the functions described of the various example modules in the client device 402 of the example of FIG. 4A can be performed by the processing unit 434. In particular, with reference to the mobile device illustrated in FIG. 4A, various sensors and/or modules can be performed via any of the combinations of modules in the control subsystem that are not illustrated, including, but not limited to, the processing unit 434 and/or the memory unit 436.

Figure 5:
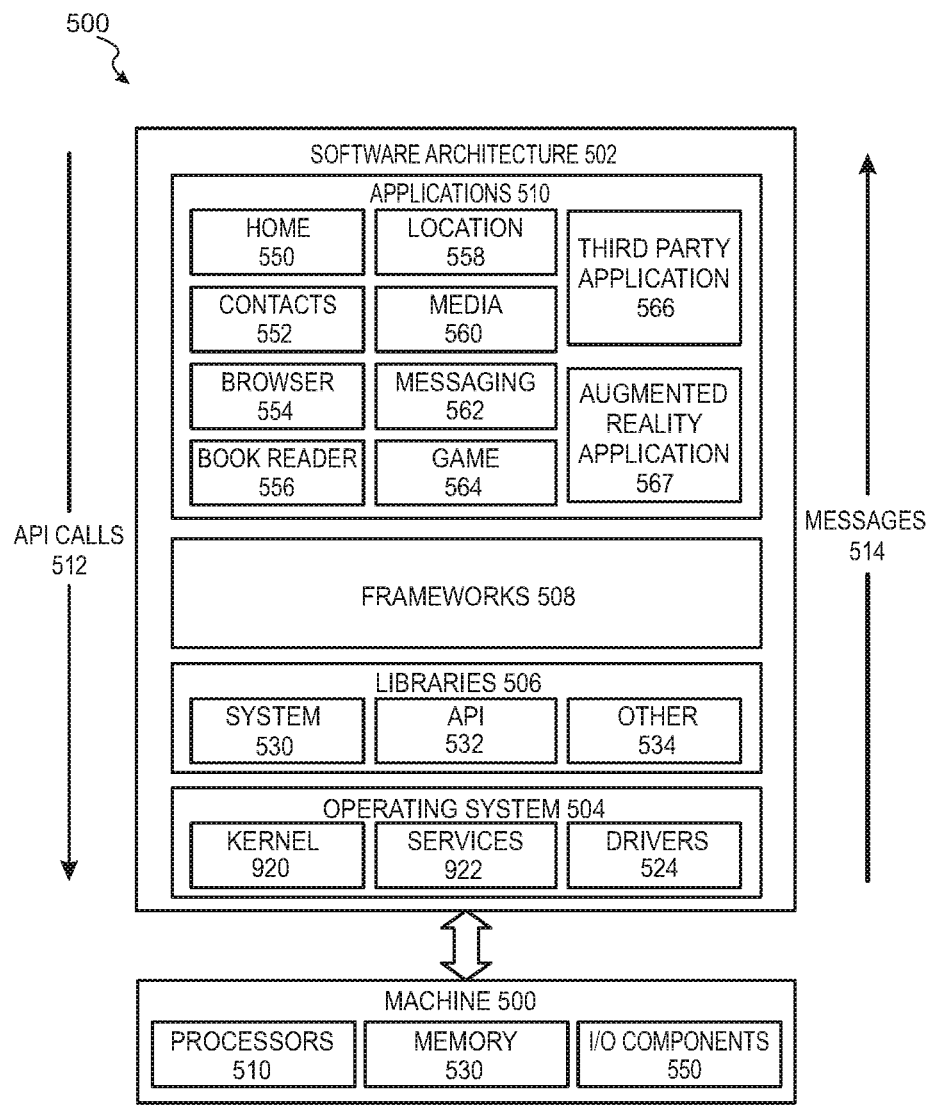
FIG. 5 is a block diagram illustrating an example of a software architecture that may be installed on a machine, in accordance with embodiments of the present disclosure.

FIG. 5 is a block diagram 500 illustrating an architecture of software 502, which can be installed on any one or more of the devices described above. FIG. 5 is a non-limiting example of a software architecture, and it will be appreciated that many other architectures can be implemented to facilitate the functionality described herein. In various embodiments, the software 502 is implemented by hardware such as machine 600 of FIG. 6 that includes processors 610, memory 630, and input/output (I/O) components 650. In this example architecture, the software 502 can be conceptualized as a stack of layers where each layer may provide a particular functionality. For example, the software 502 includes layers such as an operating system 504, libraries 506, frameworks 508, and applications 510. Operationally, the applications 510 invoke API calls 512 through the software stack and receive messages 514 in response to the API calls 512, in accordance with some embodiments.

In some embodiments, the operating system 504 manages hardware resources and provides common services. The operating system 504 includes, for example, a kernel 520, services 522, and drivers 524. The kernel 520 acts as an abstraction layer between the hardware and the other software layers consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH drivers, flash memory drivers, serial communication drivers (e.g., Universal Serial Bus (USB) drivers), WI-FI drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematics functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphic user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a search/discovery application 556, a location application 558, a media application 560, a messaging application 562, a game application 564, and other applications such as a third party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third party application 566 (e.g., an application developed using the Android, Windows or iOS. software development kit (SDK) by an entity other than the vendor of the particular platform) may be mobile software running on a mobile operating system such as Android, Windows or iOS, or another mobile operating systems. In this example, the third party application 566 can invoke the API calls 512 provided by the operating system 504 to facilitate functionality described herein.

An augmented reality application 567 may implement any system or method described herein, including integration of augmented, alternate, virtual and/or mixed realities for digital experience enhancement, or any other operation described herein.

Figure 6:
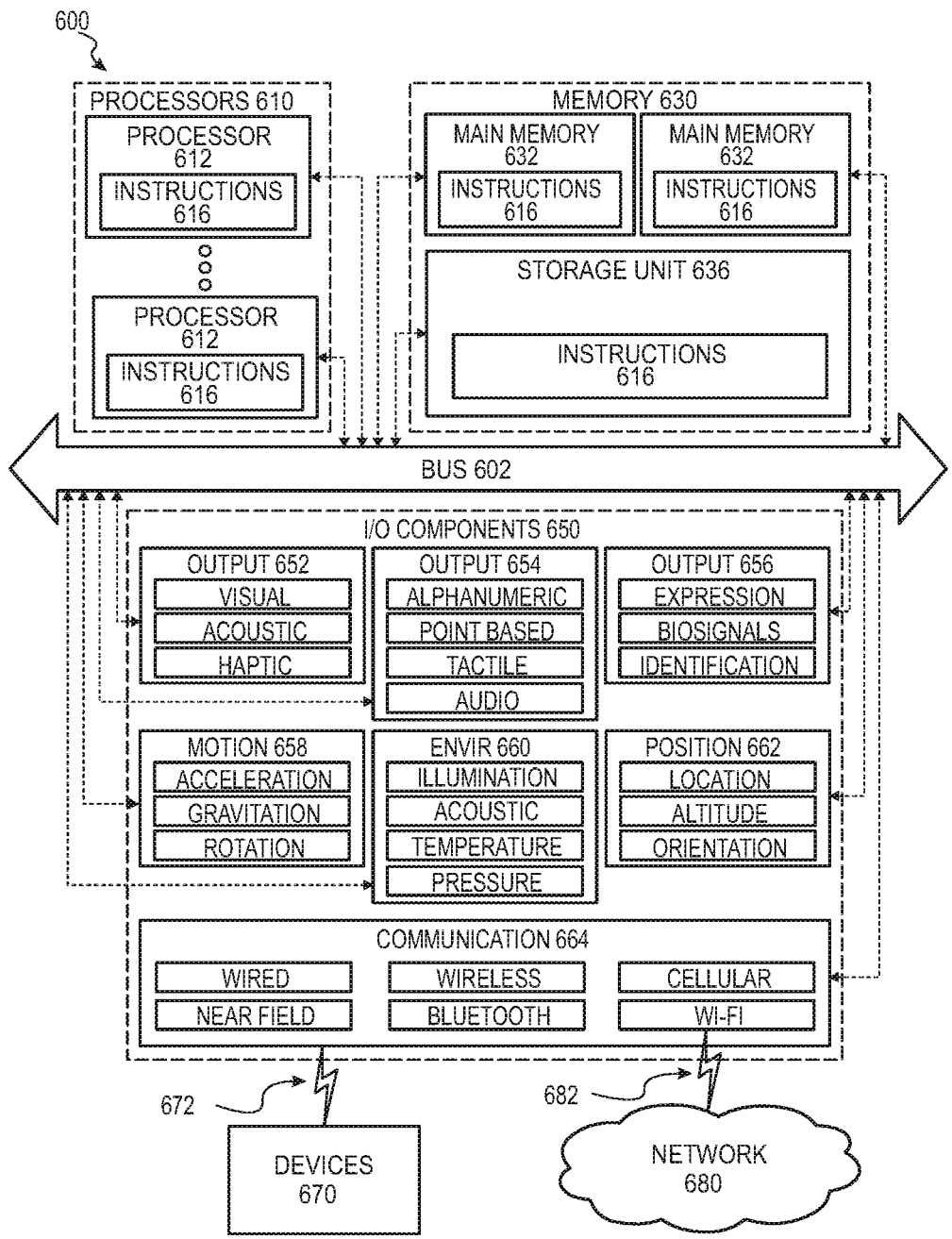
FIG. 6 is a block diagram illustrating components of a machine, according to some example embodiments, able to read a set of instructions from a machine-readable medium (e.g., a machine-readable storage medium) and perform any one or more of the methodologies discussed herein.

FIG. 6 is a block diagram illustrating components of a machine 600, according to some example embodiments, able to read a set of instructions from a machine-readable medium (e.g., a machine-readable storage medium) and perform any one or more of the methodologies discussed herein.

Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein can be executed. Additionally, or alternatively, the instruction can implement any module of FIG. 3A and any module of FIG. 4A, and so forth. The instructions transform the general, non-programmed machine into a particular machine programmed to carry out the described and illustrated functions in the manner described.

In alternative embodiments, the machine 600 operates as a standalone device or can be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 can comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a head mounted device, a smart lens, goggles, smart glasses, a smart home device (e.g., a smart appliance), other smart devices, a web appliance, a network router, a network switch, a network bridge, a Blackberry, a processor, a telephone, a web appliance, a console, a hand-held console, a (hand-held) gaming device, a music player, any portable, mobile, hand-held device or any device or machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 can include processors 610, memory/storage 630, and I/O components 650, which can be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 612 and processor 614 that may execute instructions 616. The term "processor" is intended to include multi-core processor that may comprise two or more independent processors (sometimes referred to as "cores") that can execute instructions contemporaneously. Although FIG. 6 shows multiple processors, the machine 600 may include a single processor with a single core, a single processor with multiple cores (e.g., a multi-core processor), multiple processors with a single core, multiple processors with multiples cores, or any combination thereof.

The memory/storage 630 can include a main memory 632, a static memory 634, or other memory storage, and a storage unit 636, both accessible to the processors 610 such as via the bus 602. The storage unit 636 and memory 632 store the instructions 616 embodying any one or more of the methodologies or functions described herein. The instructions 616 can also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of the processors 610 are examples of machine-readable media.

As used herein, the term "machine-readable medium" or "machine-readable storage medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" or "machine-readable storage medium" should be taken to include a single medium or multiple media (e.g., a centralized or distributed database, or associated caches and servers) able to store instructions 616. The term "machine-readable medium" or "machine-readable storage medium" shall also be taken to include any medium, or combination of multiple media, that is capable of storing, encoding or carrying a set of instructions (e.g., instructions 616) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" or "machine-readable storage medium" refers to a single storage apparatus or device, as well as "cloud-based" storage systems or storage networks that include multiple storage apparatus or devices. The term "machine-readable medium" or "machine-readable storage medium" excludes signals per se.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The I/O components 650 can include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 can include many other components that are not shown in FIG. 6. The I/O components 650 are grouped according to functionality merely for simplifying the following discussion and the grouping is in no way limiting. In example embodiments, the I/O components 650 can include output components 652 and input components 654. The output components 652 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), eye trackers, and the like.

In further example embodiments, the I/O components 652 can include biometric components 656, motion components 658, environmental components 660, or position components 662 among a wide array of other components. For example, the biometric components 656 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 can include acceleration sensor components (e.g., an accelerometer), gravitation sensor components, rotation sensor components (e.g., a gyroscope), and so forth. The environmental components 660 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 662 can include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 650 may include communication components 664 operable to couple the machine 600 to a network 680 or devices 670 via a coupling 682 and a coupling 672, respectively. For example, the communication components 664 include a network interface component or other suitable device to interface with the network 680. In further examples, communication components 664 include wired communication components, wireless communication components, cellular communication components, Near Field Communication (NFC) components, Bluetooth components (e.g., Bluetooth. Low Energy), WI-FI components, and other communication components to provide communication via other modalities. The devices 670 may be another machine or any of a wide variety of peripheral devices (e.g., a peripheral device coupled via a USB).

The network interface component can include one or more of a network adapter card, a wireless network interface card, a router, an access point, a wireless router, a switch, a multilayer switch, a protocol converter, a gateway, a bridge, bridge router, a hub, a digital media receiver, and/or a repeater.

The network interface component can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Moreover, the communication components 664 can detect identifiers or include components operable to detect identifiers. For example, the communication components 664 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 664, such as location via Internet Protocol (IP) geo-location, location via WI-FI signal triangulation, location via detecting a BLUETOOTH or NFC beacon signal that may indicate a particular location, and so forth.

In various example embodiments, one or more portions of the network 680 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or other type of cellular or wireless coupling. In this example, the coupling 682 can implement any of a variety of types of data transfer technology, such as Single Carrier Radio Transmission Technology, Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, 5G, Universal Mobile Telecommunications System (UMTS), High Speed Packet Access (HSPA), Worldwide Interoperability for Microwave Access (WiMAX), Long Term Evolution (LTE)

standard, others defined by various standard setting organizations, other long range protocols, or other data transfer technology.

The instructions 616 can be transmitted or received over the network 680 using a transmission medium via a network interface device (e.g., a network interface component included in the communication components 664) and utilizing any one of a number of transfer protocols (e.g., HTTP). Similarly, the instructions 616 can be transmitted or received using a transmission medium via the coupling 672 (e.g., a peer-to-peer coupling) to devices 670. The term "transmission medium" shall be taken to include any intangible medium that is capable of storing, encoding, or carrying the instructions 616 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the innovative subject matter has been described with reference to specific example embodiments, various modifications and changes may be made to these embodiments without departing from the broader scope of embodiments of the present disclosure. Such embodiments of the novel subject matter may be referred to herein, individually or collectively, by the term "innovation" merely for convenience and without intending to voluntarily limit the scope of this application to any single disclosure or novel or innovative concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, 6, other aspects may likewise be embodied as a means-plus-function claim, or in other forms, such as being embodied in a computer-readable medium. (Any claims intended to be treated under 35 U.S.C. § 112, 6 will begin with the words "means for".) Accordingly, the applicant reserves the right to add additional claims after filing the application to pursue such additional claim forms for other aspects of the disclosure.

What is claimed is:

1. A method to identify location metadata of a physical location for placement of virtual objects associated with the physical location, the method, comprising:
extracting a visual scene of the physical location captured by a device in the physical location;
analyzing the visual scene of the physical location to identify geometric features of the physical location to generate the location metadata;
further analyzing the visual scene through identification of physical objects in the physical location to further generate the location metadata;
collecting relative position data having relative positions and relative motion of multiple devices in the physical location, the location metadata further including the relative position data;
generating a fingerprint of the physical location using the location metadata.

2. The method of claim 1, further comprising:
determining device coordinates for the device in the physical location;
tracking device movement in the physical location to determine a position of the device relative to the fingerprint of the physical location;
placing the virtual object in the physical location based on the position of the device and the fingerprint of the physical location.

3. The method of claim 2, wherein:
the device movement of the device is determined using dead reckoning via an accelerometer or a barometer;
wherein, the device coordinates include current device coordinates or last known device coordinates.

4. The method of claim 1, further comprising:
detecting a wall or a ceiling to identify the geometric features of the physical location;
specifying or updating one or more anchor points for the wall upon detecting the wall;
using sizes known to a learning system or a machine learning algorithm to identify the physical objects.

5. The method of claim 1, further comprising:
detecting a wall or a ceiling to identify the geometric features of the physical location;
using the physical objects identified, detecting repeating patterns on the wall or the ceiling using the physical objects identified or determining a distance to the wall or the ceiling.

6. The method of claim 1, further comprising:
detecting stationary edges in the visual scene;
using the stationary edges to further identify stationary objects in the physical location;
wherein:
the stationary objects are used to generate a fingerprint of the physical location.

7. The method of claim 1, further comprising:
identifying a texture from analyzing the visual scene to detect physical features in the visual scene;
wherein:
the texture is identified from machine learning training.

8. The method of claim 1, further comprising:
identifying moving objects in the physical location;
detecting occlusion in the visual scene by detection of the moving objects in the physical location;
detecting a position of the sun or the moon in the sky;
determining an orientation of the physical location in the visual scene using the position of the sun or the moon.

9. The method of claim 1, further comprising:
generating an acoustic fingerprint of the physical location through performing audio analysis to identify rooms in the physical location;
using echolocation in the audio analysis to determine a distance to a wall in the physical location;
wherein the finger print of the physical location includes a visual finger print and the acoustic finger print;
wherein:
a microphone on the device in the physical location is used to detect or record audio signals used in the audio analysis.

10. The method of claim 1, further comprising:
generating markers using the fingerprint of the physical location for an augmented reality platform to associate the virtual object with a given place in the physical location;
wherein, the physical location is indoors or outdoors.

11. The method of claim 1, further comprising:
subdividing the physical location into multiple blocks;
wherein, the visual scene is extracted from one of the multiple blocks;
wherein, the relative position data having relative positions and relative motion of the multiple devices in the physical location is determined using analysis performed by the multiple devices devices in the physical location;
updating the fingerprint of the physical location using the relative position data.

12. The method of claim 1, further comprising:
updating the fingerprint of the physical location using an SSID or a signal strength of a wireless network accessible in the physical location.

13. The method of claim 1, further comprising:
updating the fingerprint of the physical location using one or more of, GPS location data associated with the physical location and a map API relevant to the physical location.

14. The method of claim 1, further comprising:
enabling direct sharing of location metadata aggregated by multiple devices in the physical location among the multiple devices using multi-peer connectivity;

wherein, the relative position data aggregated by the multiple devices is transmitted to a remote server or remote database;

generating and storing a set of location fingerprints in the physical locations and another physical location by:
  collecting the relative position data aggregated by the multiple devices in the physical location and;
  further collecting additional relative position data aggregated by additional devices in another physical location.

15. A machine-readable non-transitory storage medium, having stored thereon instructions, which when executed by a processor, cause the processor to use a fingerprint of a physical location for placement of virtual objects associated with the physical location, the method, comprising:
  extracting a visual scene of the physical location captured by a device in the physical location;
  analyzing the visual scene of the physical location to identify geometric features of the physical location;
  further analyzing the visual scene through identification of physical objects in the physical location;
  collecting relative position data having relative positions and relative motion of multiple devices in the physical location, the location metadata further including the relative position data;
  generating a fingerprint of the physical location using the location metadata;
  determining device coordinates for the device in the physical location;
  tracking device movement in the physical location to determine a position of the device relative to the fingerprint of the physical location;
  rendering the virtual object in the physical location based on the position of the device and the fingerprint of the physical location.

16. A system to identify location metadata of a physical location for placement of virtual objects associated with the physical location, the system, comprising:
  means for, extracting a visual scene of the physical location captured by a device in the physical location;
  means for, analyzing the visual scene of the physical location to identify geometric features of the physical location to generate the location metadata;
  means for, further analyzing the visual scene through identification of physical objects in the physical location to further generate the location metadata;
  means for, collecting relative position data having relative positions and relative motion of multiple devices in the physical location, the location metadata further including the relative position data;
  means for, generating a fingerprint of the physical location using the location metadata;
  means for, identifying a texture from analyzing the visual scene to detect physical features in the visual scene.

17. The system of claim 16, further comprising:
  means for, subdividing the physical location into multiple blocks;
  wherein, the visual scene is extracted from one of the multiple blocks;
  means for, collecting the relative position data about the physical location using analysis performed by the multiple devices in the physical location;
  means for, updating the finger print of the physical location using the relative position data.

* * * * *